(12) United States Patent
Li et al.

(10) Patent No.: US 12,286,164 B2
(45) Date of Patent: Apr. 29, 2025

(54) ALL-TERRAIN VEHICLE

(71) Applicant: SEGWAY TECHNOLOGY CO., LTD., Changzhou (CN)

(72) Inventors: Xiang Li, Changzhou (CN); Ge Fan, Changzhou (CN)

(73) Assignee: SEGWAY TECHNOLOGY CO., LTD. (CN)

( * ) Notice: Subject to any disclaimer, the term of this patent is extended or adjusted under 35 U.S.C. 154(b) by 369 days.

(21) Appl. No.: 17/831,026

(22) Filed: Jun. 2, 2022

(65) Prior Publication Data
US 2022/0388580 A1 Dec. 8, 2022

(30) Foreign Application Priority Data

Jun. 3, 2021 (CN) ............. 202110621661.6
Jun. 3, 2021 (CN) ............. 202121240972.X
Jun. 3, 2021 (CN) ............. 202121241920.4
Jun. 3, 2021 (CN) ............. 202121242142.0

(51) Int. Cl.
  *B62D 33/06* (2006.01)
  *B60K 11/06* (2006.01)
  *B62D 21/10* (2006.01)

(52) U.S. Cl.
  CPC .............. *B62D 33/06* (2013.01); *B60K 11/06* (2013.01); *B62D 21/10* (2013.01); *B60Y 2200/124* (2013.01); *B60Y 2200/92* (2013.01)

(58) Field of Classification Search
  CPC ...... B62D 33/06; B62D 21/10; B62D 23/005; B60K 11/06; B60K 6/40; B60K 6/52; B60K 1/00; B60K 2001/0416; B60K 17/16; B60K 17/354; B60K 25/02; B60K 6/42; B60K 2001/0422; B60K 2360/174; B60K 2015/0633; B60K 2026/025;
(Continued)

(56) References Cited

U.S. PATENT DOCUMENTS 9,994,260 B2 * 6/2018 Ito .................. B62D 21/152
10,118,477 B2 * 11/2018 Borud .............. B60K 6/383
(Continued)

FOREIGN PATENT DOCUMENTS

CN  101932470 A   12/2010
CN  102341622 A * 2/2012 ............ B60W 10/08
(Continued)

*Primary Examiner* — James A Shriver, II
*Assistant Examiner* — Michael T. Walsh
(74) *Attorney, Agent, or Firm* — Emerson, Thomson & Bennett, LLC; Roger D. Emerson; Matt J. Wilson

(57) ABSTRACT

The present disclosure discloses an all-terrain vehicle. The all-terrain vehicle includes: a signal acquirer; an engine; an engine controller; a first differential; a first wheel; a driving motor; a motor controller; a battery power source electrically connected with the driving motor; a second differential in transmission connection with the driving motor; and second wheels in transmission connection with the second differential and are located at both lateral sides of the second differential. Therefore, by connecting and matching the first differential, the engine, the driving motor and the second differential with the corresponding components, the hybrid all-terrain vehicle allows intelligent four-wheel drive, reduces energy consumption, and has a compact and reasonable structure.

12 Claims, 16 Drawing Sheets

(58) Field of Classification Search
CPC ...... B60K 2015/0632; B60Y 2200/124; B60Y 2200/92; Y02T 10/62
See application file for complete search history.

(56) References Cited

U.S. PATENT DOCUMENTS

| | | | |
|---|---|---|---|
| 10,232,699 B2 * | 3/2019 | Oyama | B60K 6/26 |
| 12,103,589 B2 * | 10/2024 | Li | B62D 25/02 |
| 2002/0112905 A1 | 8/2002 | Kitai et al. | |
| 2011/0276241 A1 * | 11/2011 | Nakao | B60W 10/06 |
| | | | 477/3 |

FOREIGN PATENT DOCUMENTS

| | | | | |
|---|---|---|---|---|
| CN | 102905923 | A | | 1/2013 |
| CN | 204398840 | U | * | 6/2015 |
| CN | 104943526 | A | * | 9/2015 |
| CN | 205439959 | U | * | 8/2016 |
| CN | 108583330 | A | | 9/2018 |
| CN | 208931072 | U | | 6/2019 |
| CN | 110171386 | A | * | 8/2019 ......... B60K 15/0409 |
| CN | 210310698 | U | | 4/2020 |
| CN | 211663055 | U | | 10/2020 |
| DE | 102020129883 | B4 | * | 3/2023 ................ B60L 1/02 |
| JP | 4223205 | B2 | * | 2/2009 .......... B60K 28/165 |
| JP | 6810810 | B2 | * | 1/2021 ............... B60K 1/04 |
| WO | WO-2011042951 | A1 | * | 4/2011 ........... B60W 10/06 |

* cited by examiner

ALL-TERRAIN VEHICLE

CROSS-REFERENCE

The present disclosure claims priority to Chinese Application No. 202110621661.6 filed on Jun. 3, 2021, Chinese Application No. 202121240972.X filed on Jun. 3, 2021, Chinese Application No. 202121241920.4 filed on Jun. 3, 2021, and Chinese Application No. 202121242142.0 filed on Jun. 3, 2021, and entitled "ALL-TERRAIN VEHICLE", all of which are incorporated herein by reference in their entirety.

TECHNICAL FIELD

The present disclosure relates to the technical field of vehicles, in particular to an all-terrain vehicle, including a hybrid all-terrain vehicle.

BACKGROUND

With the development of science and technology, an all-terrain vehicle is gradually recognized by people for its good trafficability and outstanding driving pleasure, and is gradually coming into lives of people.

In some related technologies, the power performance of an all-terrain vehicle has a positive correlation trend with the discharging amount of the engine, so that it is difficult to improve the performance on the engine of a smaller discharging amount. At the same time, due to the exhaust noise of a fuel engine, the demands of users cannot be met in some special environments. The seat and related components of the all-terrain vehicle are usually provided separately, and the available space below the seat cannot be utilized by providing related components, so that the space below the seat will be left idle, and the structure of the all-terrain vehicle is not compact enough. In other related technologies, the transmission shaft used to transmit power on the all-terrain vehicle is exposed to the outside, and the transmission shaft is easily eroded by foreign matters and impacted by external forces, resulting in damage. Some all-terrain vehicles provide the transmission shaft in a relatively closed space, which can protect the transmission shaft. However, when the transmission shaft fails, the transmission shaft cannot be repaired and replaced quickly and conveniently, which will increase the difficulty of repairing and replacing the transmission shaft. In some related technologies, the engine of the all-terrain vehicle is cooled through liquid by an external radiator, which not only makes the radiator occupy the space of the all-terrain vehicle, but also cannot make good use of air outside the all-terrain vehicle when the all-terrain vehicle is running normally.

SUMMARY

The present disclosure aims at solving at least one of the technical problems existing in the prior art.

One or more embodiments of the present disclosure propose a hybrid all-terrain vehicle, which not only can improve the power performance of the hybrid all-terrain vehicle without changing the discharging amount of the engine, but also can realize intelligent four-wheel drive.

A hybrid all-terrain vehicle according to an embodiment of the present disclosure comprises: a signal acquirer; an engine; an engine controller, which is electrically connected with the engine and the signal acquirer; a first differential, which is in transmission connection with the engine; first wheels, which are in transmission connection with the first differential and are located at both lateral sides of the first differential; a driving motor; a motor controller, which is electrically connected with the driving motor and the signal acquirer; a battery power source, which is electrically connected with the driving motor; a second differential, which is in transmission connection with the driving motor; and second wheels, which are in transmission connection with the second differential and are located at both lateral sides of the second differential.

Therefore, the first differential, the engine, the driving motor and the second differential are reasonably provided in the hybrid all-terrain vehicle, the engine is in transmission connection with the first differential, and the driving motor is in transmission connection with the second differential, so that the operating states of the engine and the driving motor can be accurately controlled by the signal acquirer to control the first wheel and the second wheel at both sides of the first differential and the second differential, thus not only realizing the intelligent four-wheel drive of the hybrid all-terrain vehicle, but also improving the power performance of the hybrid all-terrain vehicle without changing the discharging amount of the engine. In addition, this can make the structural layout of the hybrid all-terrain vehicle more compact and reasonable.

According to some embodiments of the present disclosure, the hybrid all-terrain vehicle further comprises: a frame, wherein the frame is formed with an operator cabin and a power cabin, the operator cabin is located at the front side of the power cabin, the driving motor is disposed in the operator cabin, and the engine is disposed in the power cabin.

According to some embodiments of the present disclosure, the battery power source and the motor controller are both disposed in the operator cabin.

According to some embodiments of the present disclosure, a seat is provided in the operator cabin, an installation space is formed below the seat, and the driving motor, the motor controller and the battery power source are transversely arranged at intervals in the installation space.

According to some embodiments of the present disclosure, the hybrid all-terrain vehicle further comprises: a fuel tank, wherein the fuel tank is provided in the installation space, the motor controller and the battery power source are located on a lateral side of the driving motor, and the fuel tank is located at the other lateral side of the driving motor.

According to some embodiments of the present disclosure, there are a plurality of seats, including a driver seat and passenger seats, the fuel tank is located below the driver seat, the battery power source and the motor controller are located below the passenger seat, the driving motor is located below the passenger seat, or the driving motor is located below the gap between the driver seat and the passenger seat.

According to some embodiments of the present disclosure, the frame comprises an underframe, the driving motor and the second differential are both provided above the underframe, a first transmission shaft is provided between the driving motor and the second differential, and the first transmission shaft is located above the underframe.

According to some embodiments of the present disclosure, in the operator cabin, the underframe is further provided with a base plate of the operator cabin. The base plate of the operator cabin comprises: a first floor, a second floor and a third floor. In the transverse direction, the third floor is connected between the first floor and the second floor. The third floor is projected upwards to form an accommodating groove in which the first transmission shaft is accommodated.

According to some embodiments of the present disclosure, the engine and the first differential are both provided in the power cabin, and a second transmission shaft is connected between the engine and the first differential; or the output end of the engine is splined with the input end of the first differential.

According to some embodiments of the present disclosure, in the longitudinal direction of the hybrid all-terrain vehicle, the first differential, the engine, the driving motor and the second differential are sequentially arranged.

Some embodiments of the present disclosure propose an all-terrain vehicle, which renders the structure of the vehicle compact with the driving motor, the motor controller and the battery power source arranged below the seat.

An all-terrain vehicle according to an embodiment of the present disclosure comprises: a frame, which forms an operator cabin, wherein a seat is provided in the operator cabin; a driving motor, which is provided below the seat; a motor controller, which is provided below the seat, is located at a lateral side of the driving motor, and is electrically connected with the driving motor; a battery power source, which is provided below the seat, is located at a lateral side of the driving motor, and is electrically connected with the motor controller and the driving motor.

Therefore, the driving motor, the motor controller and the battery power source are provided below the seat, and the motor controller and battery power source are both provided at a lateral side of the driving motor, which not only can ensure the stability of the installation of the driving motor, the motor controller and the battery power source, but also can make full use of the available space below the seat, so that the structure of the all-terrain vehicle is more compact. In addition, the seat can protect the driving motor, the motor controller and the battery power source, which can improve the reliability of the all-terrain vehicle.

According to some embodiments of the present disclosure, an installation space is formed below the seat, the driving motor, the motor controller and the battery power source are transversely distributed at intervals in the installation space, and the battery power source is provided at the lateral side of the motor controller away from the driving motor.

According to some embodiments of the present disclosure, the all-terrain vehicle further comprises: a fuel tank, wherein the fuel tank is provided in the installation space, the motor controller and the battery power source are located on a lateral side of the driving motor, and the fuel tank is located at the other lateral side of the driving motor.

According to some embodiments of the present disclosure, there are a plurality of seats, including a driver seat and passenger seats, the fuel tank is located below the driver seat, the battery power source and the motor controller are located below the passenger seat, the driving motor is located below the passenger seat, or the driving motor is located below the gap between the driver seat and the passenger seat.

According to some embodiments of the present disclosure, the fuel tank is connected with an oil filler, the battery power source is connected with a charging port, and both the oil filler and the oil filler charging port are oppositely provided at both sides of the vertical plane where the longitudinal central axis of the all-terrain vehicle is located.

According to some embodiments of the present disclosure, the frame is further formed with a power cabin, the power cabin is located at the rear side of the operator cabin, a cross beam is transversely provided between the operator cabin and the power cabin, the cross beam is fixedly connected with the frame, and both the charging port and the oil filler extend to one side of the cross beam facing the power cabin.

According to some embodiments of the present disclosure, below the seat, the motor controller is higher than the driving motor and the battery power source.

According to some embodiments of the present disclosure, the driving motor is provided with a first interface for connecting the motor controller and a second interface for connecting the battery power source, and both the first interface and the second interface are provided at the rear side of the driving motor and are arranged facing upwards.

According to some embodiments of the present disclosure, the motor controller is provided with a third interface for connecting the driving motor and a fourth interface for connecting the battery power source, and the third interface and the fourth interface are both provided at the rear side of the motor controller and are arranged facing backwards.

According to some embodiments of the present disclosure, the battery power source is provided with a fifth interface for connecting the driving motor and a sixth interface for connecting the motor controller, and both the fifth interface and the sixth interface are provided at the rear side of the battery power source and are arranged facing backwards.

Other embodiments of the present disclosure propose an all-terrain vehicle. The transmission shaft of the all-terrain vehicle is provided in the accommodating groove inside the detachable cover plate, which can not only protect the transmission shaft, but also facilitate the maintenance and disassembly of the transmission shaft.

An all-terrain vehicle according to an embodiment of the present disclosure comprises: a frame; a driving motor, which is provided on the frame; a transmission shaft, which is provided on the frame and is in transmission connection with the driving motor; a cover, which is formed with an accommodating groove which opens downwards, wherein the transmission shaft is at least partially accommodated in the accommodating groove, and the cover is detachably provided on the frame.

Therefore, the transmission shaft is at least partially accommodated in the accommodating groove with the cover opened downwards, and the cover is detachably provided on the frame, which not only can make the cover play a role of shielding and protecting the transmission shaft, but also can prolong the service life of the transmission shaft, and facilitate the installation and disassembly of the cover, thus facilitating the opening of the cover and the maintenance and disassembly of the transmission shaft.

According to some embodiments of the present disclosure, the cover comprises a top plate and side plates, the side plates are connected to both sides of the top plate, the top plate and the side plates jointly define the accommodating groove, the top plate is above the transmission shaft, and the side plates are detachably connected with the frame.

According to some embodiments of the present disclosure, the side plate comprises a main plate part and a flange, one end of the main plate part is connected with the top plate and the other end thereof is connected with the flange, and the flange is detachably connected with the frame.

According to some embodiments of the present disclosure, the flange is provided with a first installing hole, and the frame is provided with a second installing hole at a position corresponding to the first installing hole. The all-terrain vehicle further comprises a fastener, and the fastener sequentially penetrates through the first installing hole and the second installing hole.

According to some embodiments of the present disclosure, there are at least two first installing holes, second installing holes and fasteners which correspond to each other, and at least two of the first installing holes are provided at intervals in the extension direction of the flange.

According to some embodiments of the present disclosure, the all-terrain vehicle further comprises: a first floor and a second floor, wherein the first floor and the second floor are connected to both lateral sides of the cover, respectively, the first floor and the flange at one side are stacked, and the second floor and the flange at the other side are stacked.

According to some embodiments of the present disclosure, the driving motor is provided with an output end, the output end is in transmission connection with the transmission shaft, and the output end is located in the accommodating groove.

According to some embodiments of the present disclosure, the frame is formed with an operator cabin, a seat is provided in the operator cabin, an installation space is formed below the seat, the driving motor is provided in the installation space, and the cover is provided at the lower front side of the seat.

According to some embodiments of the present disclosure, the front end of the cover is opened to form an air inlet, the rear end of the cover is opened to form an air outlet, and the air outlet is in communication with the installation space.

According to some embodiments of the present disclosure, the top rear side of the cover is provided with a cup groove.

One or more embodiments of the present disclosure propose an all-terrain vehicle, which can make full use of air outside the all-terrain vehicle to dissipate heat of the driving motor and cool the driving motor by providing an air channel part.

An all-terrain vehicle according to an embodiment of the present disclosure comprises: a frame, which comprises a vehicle underframe; a driving motor, which is provided on the vehicle underframe; a differential, which is in transmission connection with the driving motor; wheels, which are in transmission connection with the differential through a driving half-shaft, and are located at both sides of the differential; and an air channel part, which is provided on the vehicle underframe and forms an air channel with the vehicle underframe, wherein the air channel is provided with an air inlet and an air outlet, the air inlet is opened toward the outside of the frame, and the air outlet is opened toward the driving motor so that air blows to the driving motor.

Therefore, the air inlet of the air channel is opened toward the outside of the frame, and the air outlet of the air channel is opened toward the driving motor, so that in the running process of the all-terrain vehicle, air can enter the air channel part from the outside of the all-terrain vehicle through the air inlet, and then air is blow to the driving motor through the air outlet of the air channel part, so as to dissipate heat of the driving motor. In this way, not only the effect of dissipating heat of the driving motor can be ensured, but also the air outside the all-terrain vehicle can be made full use of. The principle and structure of heat dissipation are simple.

According to some embodiments of the present disclosure, the front of the frame is formed with an operator cabin, the air channel part comprises a front plate of the operator cabin and a base plate of the operator cabin, the front plate of the operator cabin and the base plate of the operator cabin are provided above the vehicle underframe and form the air channel with the vehicle underframe, and the air inlet of the air channel faces the longitudinal front of the frame.

According to some embodiments of the present disclosure, a seat is provided in the operator cabin, an installation space is formed below the seat, the driving motor is provided in the installation space, and the air outlet is in communication with the installation space.

According to some embodiments of the present disclosure, the all-terrain vehicle further comprises: a battery power source and a motor controller, wherein the driving motor, the motor controller, and the battery power source are transversely distributed at intervals in the installation space. The motor controller is electrically connected with the driving motor, and the battery power source is electrically connected with the driving motor.

According to some embodiments of the present disclosure, the base plate of the operator cabin comprises a first floor, a second floor, and a third floor located between the first floor and the second floor, and the top of the third floor is higher than the first floor and the second floor to form a part of the air channel.

According to some embodiments of the present disclosure, the third floor is detachably installed between the first floor and the second floor.

According to some embodiments of the present disclosure, the air channel comprises a front section, a middle section and a rear section, the middle section is located between the front section and the rear section, the front section is in communication with the air inlet, the rear section is in communication with the air outlet, the cross-sectional area of the front section is larger than that of the middle section, and/or the cross-sectional area of the rear section is larger than that of the middle section.

According to some embodiments of the present disclosure, the front plate of the operator cabin and the vehicle underframe form the front section, and the front plate of the operator cabin is configured as an inclined plate structure which is obliquely provided downwards from front to rear along the front-rear direction of the frame.

According to some embodiments of the present disclosure, the base plate of the operator cabin comprises a first section base plate and a second section base plate connected to the rear of the first section base plate, the second section base plate is higher than the first section base plate, the first section base plate and the vehicle underframe form the middle section of the air channel, and the second section base plate and the frame form the rear section.

According to some embodiments of the present disclosure, the second section base plate comprises a top wall and side walls, the side walls are vertically provided and connected between the top wall and the first section base plate, and the top wall is higher than the first section base plate and the top of the driving motor.

According to some embodiments of the present disclosure, in the area corresponding to the top wall, the distance between two side walls is increasing in the front-rear direction, and the cross-sectional area of the air outlet is larger than that of the driving motor.

According to some embodiments of the present disclosure, a cup groove is provided at the top wall, and the bottom of the cup groove is higher than the top of the first section base plate.

According to some embodiments of the present disclosure, at least two convex ribs with different shapes are distributed on the third floor corresponding to the first section base plate, and at least two convex ribs are staggered on the third floor corresponding to the first section base plate.

According to some embodiments of the present disclosure, the all-terrain vehicle further comprises: a power steering system, which is located in front of the front plate of the operator cabin.

According to some embodiments of the present disclosure, the output end of the driving motor is connected with a transmission shaft, the transmission shaft is located in the air channel, and the output end of the driving motor is at least partially located in the air channel.

Additional aspects and advantages of the present disclosure will be set forth in part in the following description, and will become apparent from the following description in part, or may be learned by practice of the present disclosure.

BRIEF DESCRIPTION OF THE DRAWINGS

The above and/or additional aspects and advantages of the present disclosure will become apparent and understandable from the description of embodiments in conjunction with the following drawings, in which.

REFERENCE NUMBER

Figure 1:
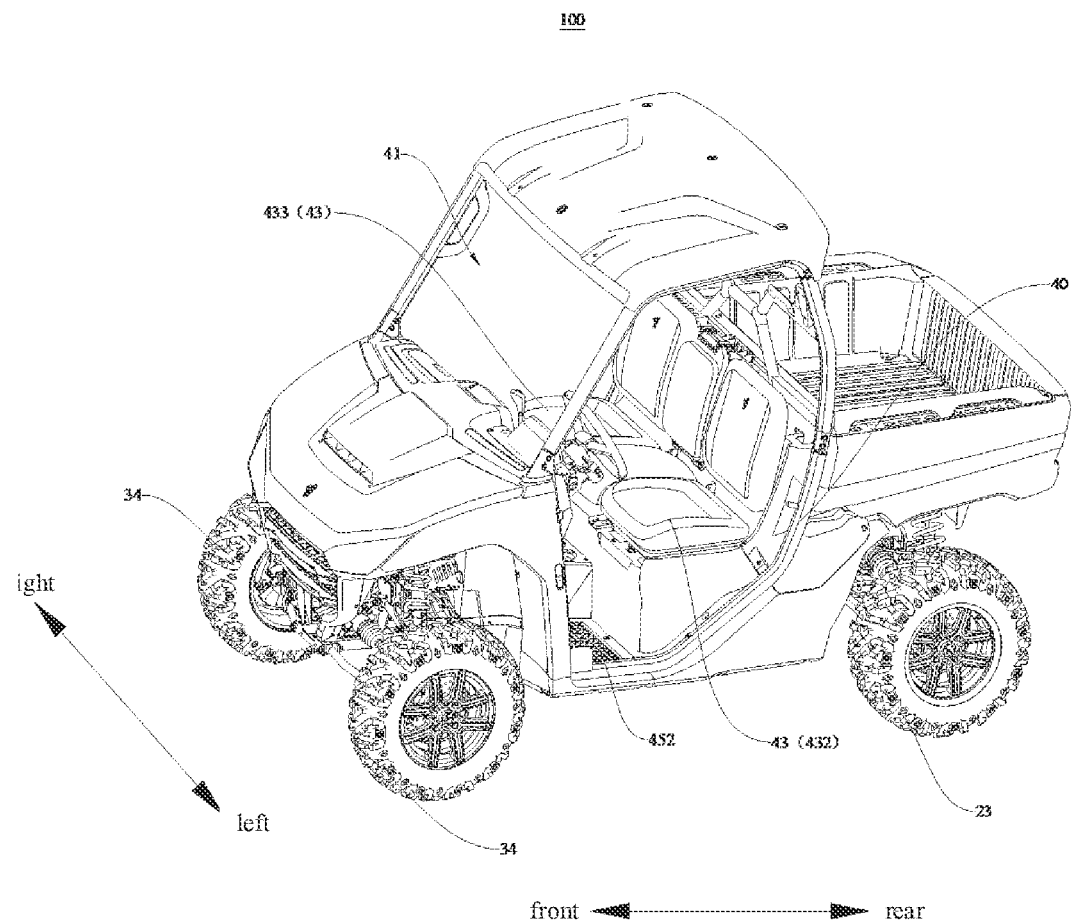
FIG. 1 is a schematic diagram of a hybrid all-terrain vehicle according to an embodiment of the present disclosure.

100—hybrid all-terrain vehicle;
10—signal acquirer;
20—engine; 201—crankcase; 202—cylinder; 21—engine controller; 22—first differential; 23—first wheel;
30—driving motor; 31—motor controller; 32—battery power source; 33—second differential; 34—second wheel; 35—first transmission shaft;
40—frame; 41—operator cabin; 42—power cabin; 43—seat; 431—installation space; 432—driver seat; 433—passenger seat; 44—underframe; 45—base plate of the operator cabin; 451—first floor; 452—second floor; 453—third floor; 4531—accommodating groove;
50—fuel tank;
200—all-terrain vehicle;
210—frame; 211—operator cabin; 212—seat; 2121—installation space; 2122—driver seat; 2123—passenger seat; 213—power cabin; 214—cross beam;
220—driving motor; 221—first interface; 222—second interface;
230—motor controller; 231—third interface; 232—fourth interface;
240—battery power source; 241—charging port; 242—fifth interface; 243—sixth interface;
250—fuel tank; 251—oil filler;
260—engine;
300—all-terrain vehicle;
310—frame; 301—second installing hole; 311—operator cabin; 312—first floor; 313—second floor; 314—seat; 315—installation space;
320—driving motor; 321—transmission shaft; 322—output end;
330—cover; 331—air inlet; 332—air outlet; 333—accommodating groove; 334—top plate; 335—side plate; 351—main plate part; 352—flange; 3521—first installing hole, 336—cup groove; 340—fastener;
900—all-terrain vehicle;
910—frame; 901—vehicle underframe; 911—operator cabin; 9111—first floor; 9112—second floor; 9113—third floor; 912—seat, 9121—installation space; 9122—driver seat; 9123—passenger seat;
920—driving motor; 921—transmission shaft; 922—differential; 923—wheel; 924—driving half-shaft;
930—air channel part; 931—air inlet; 932—air outlet; 933—air channel; 9331—front section; 9332—middle section; 9333—rear section; 934—base plate of the operator cabin; 9341—first section base plate; 9342—second section base plate; 3421—top wall; 3422—side wall; 935—front plate of the operator cabin; 936—cup groove; 937—convex rib;

940—battery power source; 950—motor controller; 960—engine.

DETAILED DESCRIPTION OF THE EMBODIMENTS

Embodiments of the present disclosure are described in detail hereinafter, the embodiments described with reference to the drawings are exemplary, and the embodiments of the present disclosure are described in detail hereinafter.

A hybrid all-terrain vehicle 100 according to an embodiment of the present disclosure is described with reference to FIG. 1 to FIG. 6 hereinafter.

As shown in FIG. 1, FIG. 2, FIG. 3 and FIG. 6, the hybrid all-terrain vehicle 100 according to the embodiment of the present disclosure comprises a signal acquirer 10, an engine 20, an engine controller 21, a first differential 22, a first wheel 23, a driving motor 30, a motor controller 31, a battery power source 32, a second differential 33 and a second wheel 34, wherein the engine controller 21 is electrically connected with the engine 20 and the signal acquirer 10, the first differential 22 is in transmission connection with the engine 20, and the first wheels 23 are in transmission connection with the first differential 22 and are located at both lateral sides of the first differential 22.

Specifically, the signal acquirer 10 can be used to acquire and analyze the real-time operating state of the hybrid all-terrain vehicle 100, and then the signal acquirer 10 sends an operating instruction to the engine controller 21 according to the analysis result. The engine controller 21 controls the operating state of the engine 20 according to the operating instruction of the signal acquirer 10. For example, when the signal acquirer 10 sends a start-up operating instruction to the engine controller 21, the engine controller 21 controls the engine 20 to turn on, so that the engine 20 drives the first differential 22 to rotate, and so that the first wheels 23 at both lateral ends of the first differential 22 are driven by the first differential 22 to rotate. In this way, the hybrid all-terrain vehicle 100 can control the active rotation of the first wheels 23, and the reliability of the hybrid all-terrain vehicle 100 can be improved.

Further, as shown in FIG. 1, FIG. 2, FIG. 3 and FIG. 6, the motor controller 31 is electrically connected with the driving motor 30 and the signal acquirer 10. The second differential 33 is in transmission connection with the driving motor 30. The second wheels 34 are in transmission connection with the second differential 33, and are located at both lateral sides of the second differential 33. Specifically, the signal acquirer 10 can be used to acquire and analyze the real-time operating state of the hybrid all-terrain vehicle 100, and then the signal acquirer 10 can send an operating instruction to the motor controller 31 according to the analysis result. The motor controller 31 controls the operating state of the driving motor 30 according to the operating instruction of the signal acquirer 10. For example, when the signal acquirer 10 sends a start-up operating instruction to the motor controller 31, the motor controller 31 controls the driving motor 30 to turn on, so that the driving motor 30 drives the second differential 33 to rotate, and so that the second wheels 34 at both lateral ends of the second differential 33 are driven by the second differential 33 to rotate. In this way, the hybrid all-terrain vehicle 100 can control the active rotation of the second wheels 34, and the reliability of the hybrid all-terrain vehicle 100 can be improved. The battery power source 32 is electrically connected with the driving motor 30, and the battery power source 32 can continuously and stably supply power to the driving motor 30 to maintain the normal operation of the driving motor 30.

Figure 6:
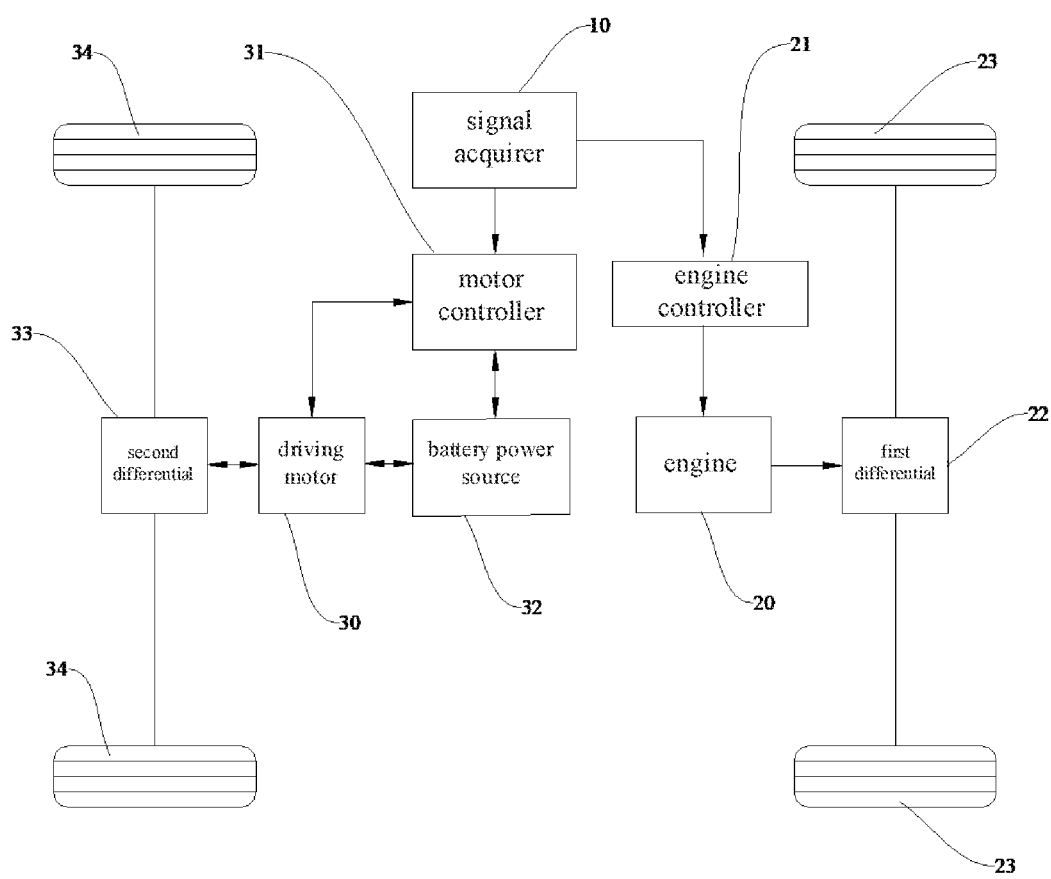
FIG. 6 is a hybrid schematic diagram of a hybrid all-terrain vehicle according to an embodiment of the present disclosure.

Further, as shown in FIG. 6, the signal acquirer 10 can analyze different results according to the operating state of the hybrid all-terrain vehicle 100, so as to selectively send different operating instructions to the engine controller 21 and the motor controller 31. For example, when the hybrid all-terrain vehicle 100 just starts, the signal acquirer 10 can only send a start-up operating instruction to the motor controller 31, so that the motor controller 31 controls the driving motor 30 to operate normally, and only the second wheel 34 can drive the hybrid all-terrain vehicle 100 to operate, which can not only reduce the energy consumption of the engine 20 and make the hybrid all-terrain vehicle 100 more energy-efficient, but also reduce the noise when the hybrid all-terrain vehicle 100 starts, and improve the user experience on the premise of meeting the power demand of the hybrid all-terrain vehicle 100 during start.

For another example, when the speed of the hybrid all-terrain vehicle 100 reaches a certain value, the power demand can be met only by driving the hybrid all-terrain vehicle 100 through the engine 20, and the engine 20 is in the best operating condition in this state. That is, when the fuel consumption is low, the signal acquirer 10 can only deliver the start-up instruction to the engine controller 21, so that the engine controller 21 controls the normal start-up operation of the engine 20. In this way, only the first wheel 23 can drive the hybrid all-terrain vehicle 100 to operate. unnecessary operation of the driving motor 30 can be avoided and the consumption of the battery power source 32 can be reduced when the power demand of the hybrid all-terrain vehicle 100 is met. In addition, the fuel consumption of the engine 20 can be reduced, and the reliability of the hybrid all-terrain vehicle 100 can be improved.

In addition, at this time, only the engine 20 operates to drive the first wheel 23 to rotate actively, so as to drive the normal operation of the hybrid all-terrain vehicle 100. The driving motor 30 does not drive the second wheel 34 to rotate actively, and the second wheel 34 is driven by the first wheel 23 to rotate passively. At this time, the second wheel 34 is coupled with the ground, and the driving motor 30 is pulled reversely by inertia, so that the driving motor 30 generates electricity. The current generated by the driving motor 30 can enter the battery power source 32 through the motor controller 31, or directly enter the battery power source 32 to charge the battery power source 32. In this way, the driving motor 30 can be made full use of, so that the hybrid all-terrain vehicle 100 can generate electricity by itself, and the energy consumption of the driving motor 30 can be indirectly reduced. In addition, the second wheel 34 pulls reversely the driving motor 30 to generate electricity, which can improve the braking performance of the hybrid all-terrain vehicle 100.

For another example, when the speed of the hybrid all-terrain vehicle 100 reaches a certain value and continues to accelerate, only the engine 20 drives the hybrid all-terrain vehicle 100 to operate, and the engine 20 cannot reach the optimal operating condition. That is, when the fuel consumption of the engine 20 is high, the signal acquirer 10 can simultaneously send the start-up operating instruction to the engine controller 21 and the motor controller 31, so that the engine controller 21 and the motor controller 31 control the engine 20 and the driving motor 30 to operate at the same time, respectively, and so that the first wheel 23 and the second wheel 34 both rotate actively to drive the hybrid all-terrain vehicle 100 to operate normally. At this time, the hybrid all-terrain vehicle 100 can realize intelligent four-wheel drive, so that the driving motor 30 can assist the engine 20 to operate so as to improve the power performance of the hybrid all-terrain vehicle 100 without changing the discharging amount of the engine 20, and the engine 20 can be in the best operating state, which can reduce the fuel consumption of the engine 20 and prolong the service life of the engine 20.

In addition, this not only can improve the trafficability and off-road performance of the hybrid all-terrain vehicle 100 and can improve the user experience, but also can make the hybrid all-terrain vehicle 100 run more stably and reliably on the road, and prevent the body of the hybrid all-terrain vehicle 100 from shifting and tilting when the hybrid all-terrain vehicle runs at a high speed on the snowy and slippery road, thus improving the safety of users.

Further, the signal acquirer 10 controls the driving motor 30 and the engine 20 respectively according to the operating state of the hybrid all-terrain vehicle 100, so that the driving motor 30 and the engine 20 can be selectively turned on and off according to the specific operating state of the hybrid all-terrain vehicle 100, thus not only ensuring the power performance of the hybrid all-terrain vehicle 100, but also avoiding the waste of unnecessary operation of the engine 20 and the driving motor 30. In this way, the hybrid all-terrain vehicle 100 gives consideration to both power and economy.

In addition, the signal acquirer 10 can accurately distribute the torque and rotational speed of the first wheel 23 and the second wheel 34 by analyzing the operating state of the hybrid all-terrain vehicle 100, which can improve the power performance and safety performance of the hybrid all-terrain vehicle 100.

Therefore, the first differential 22, the engine 20, the driving motor 30 and the second differential 33 are reasonably provided in the hybrid all-terrain vehicle 100, the engine 20 is in transmission connection with the first differential 22, and the driving motor 30 is in transmission connection with the second differential 33. In this way, the operating states of the engine 20 and the driving motor 30 can be accurately controlled by the signal acquirer 10. The first wheel 23 and the second wheel 34 at both sides of the first differential 22 and the second differential 33 are controlled, so that the intelligent four-wheel drive of the hybrid all-terrain vehicle 100 can be realized, and the power performance of the hybrid all-terrain vehicle 100 can be improved without changing the discharging amount of the engine 20. In addition, this can make the structure of the hybrid all-terrain vehicle 100 more compact and reasonable.

Figure 2:
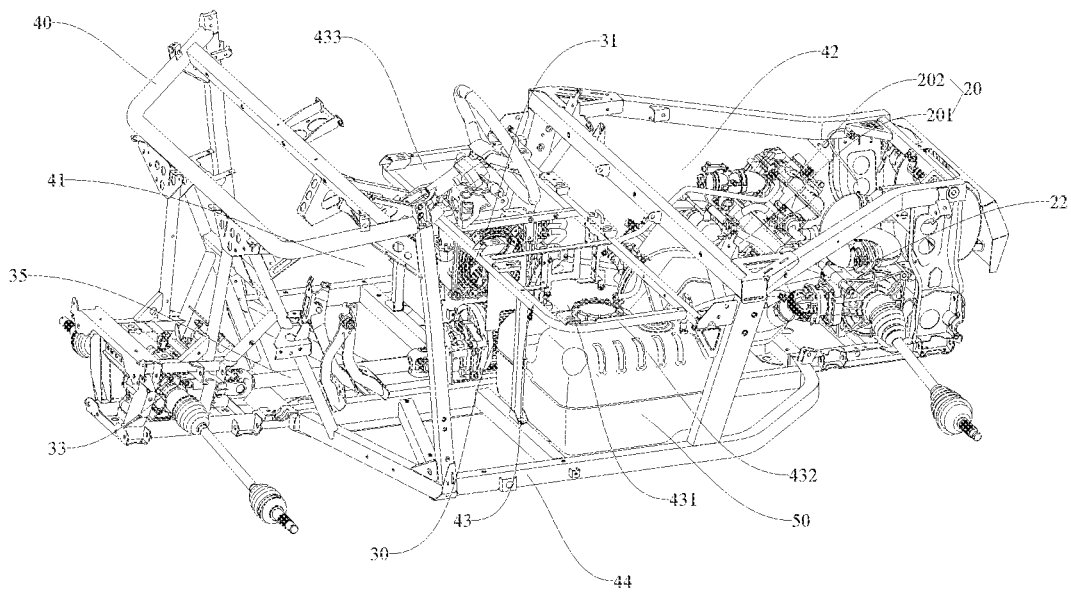
FIG. 2 is a partial schematic diagram of a hybrid all-terrain vehicle according to an embodiment of the present disclosure.
Figure 3:
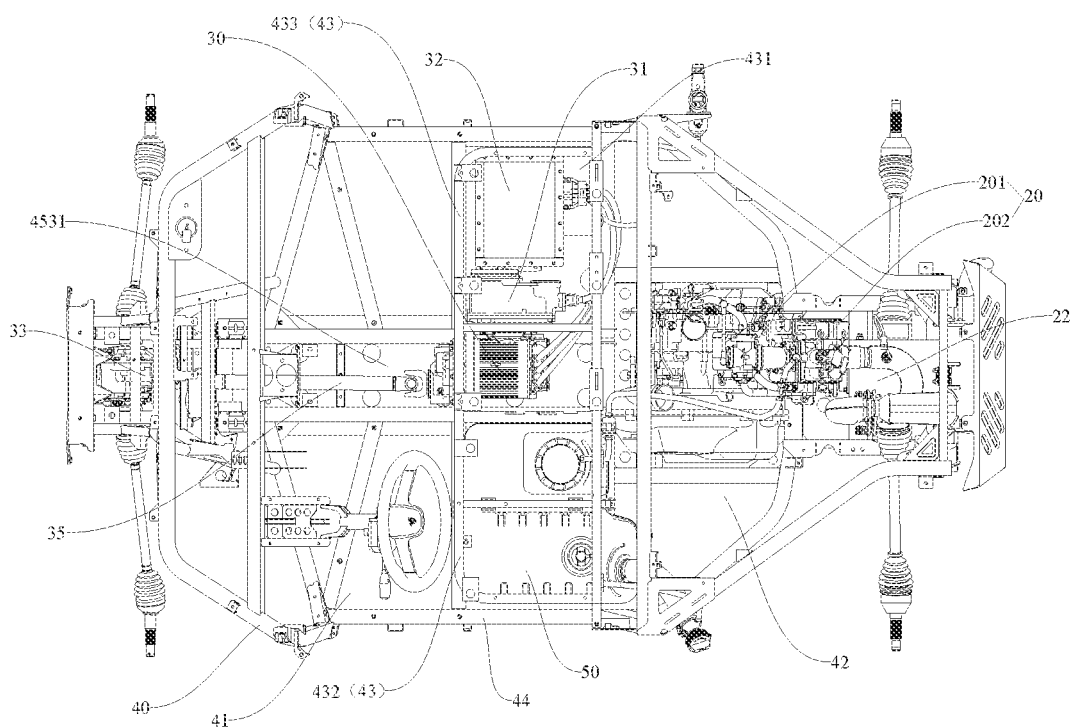
FIG. 3 is a partial schematic diagram of a hybrid all-terrain vehicle according to an embodiment of the present disclosure.
Figure 4:
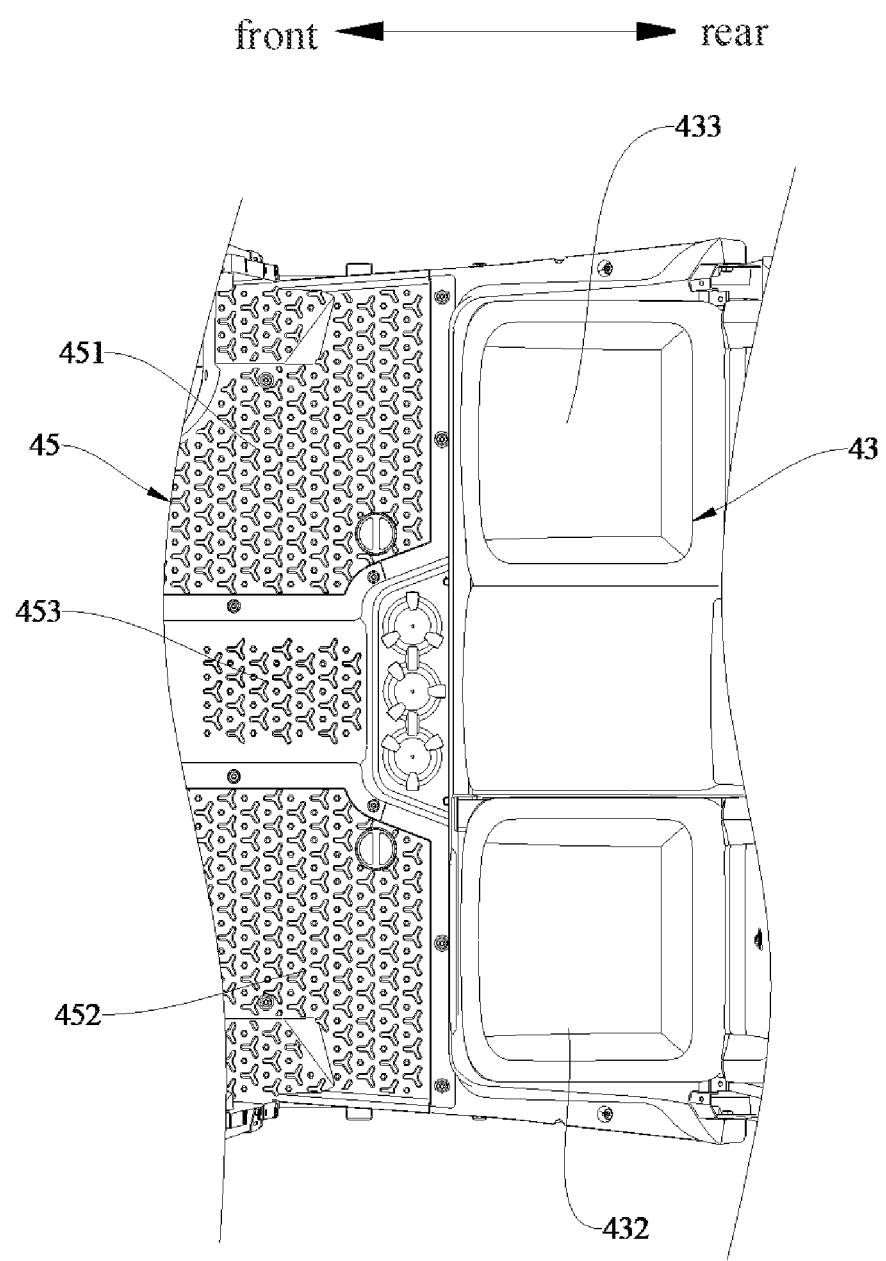
FIG. 4 is a partial schematic diagram of a hybrid all-terrain vehicle according to an embodiment of the present disclosure.
Figure 5:
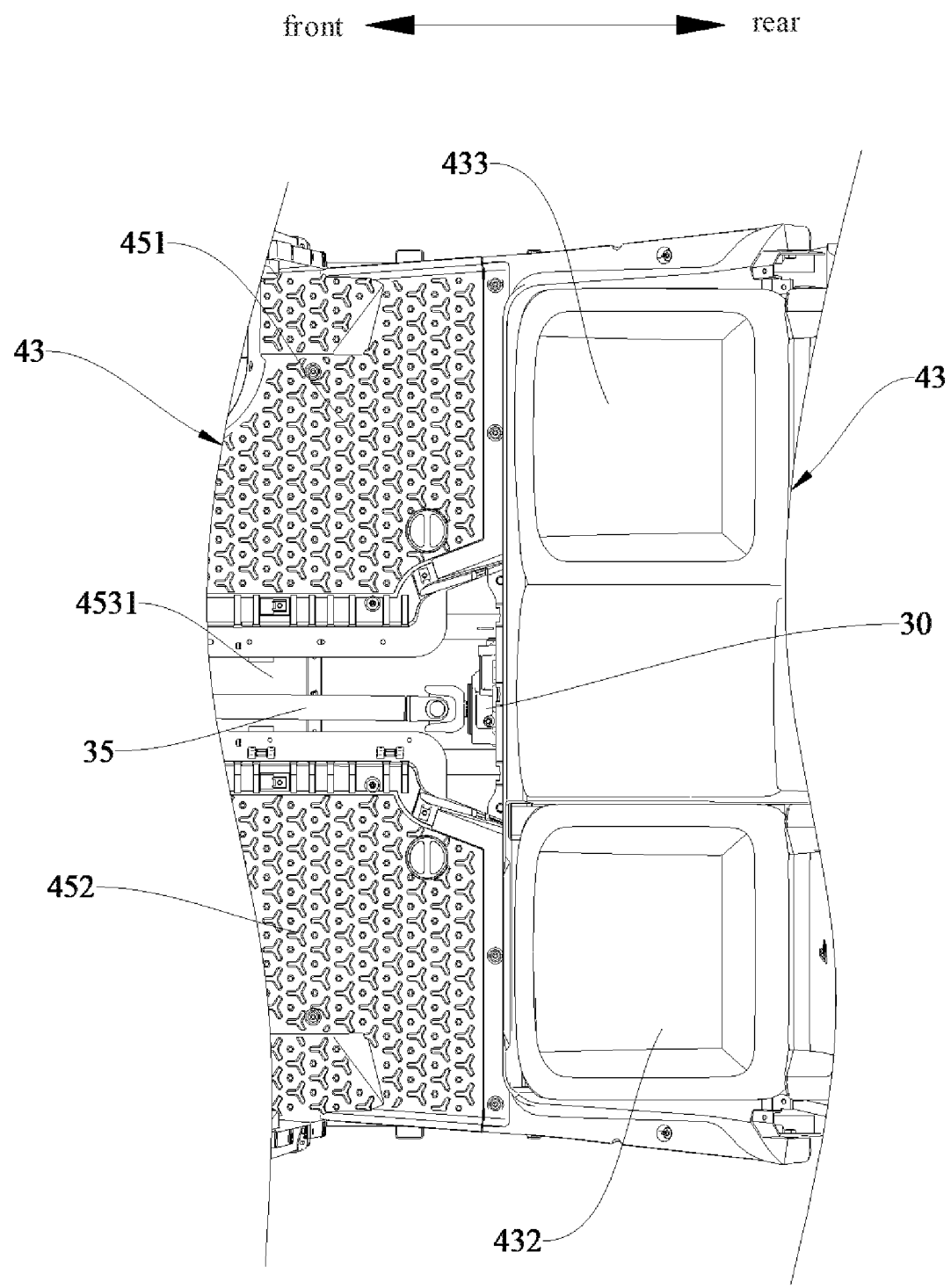
FIG. 5 is a partial schematic diagram of a hybrid all-terrain vehicle according to an embodiment of the present disclosure.

As shown in FIG. 2 and FIG. 3, the hybrid all-terrain vehicle 100 can also mainly comprise a frame 40, which is formed with an operator cabin 41 and a power cabin 42. The operator cabin 41 is located at the front side of the power cabin 42, the driving motor 30 is provided in the operator cabin 41, and the engine 20 is provided in the power cabin 42. Specifically, the operator cabin 41 is provided at the front side of the power cabin 42, which is convenient for drivers to drive the hybrid all-terrain vehicle 100 in the operator cabin 41. Further, the driving motor 30 is provided in the operator cabin 41, and the engine 20 is provided in the power cabin 42, which can not only ensure the stability and reliability of the installation of the driving motor 30 and the engine 20 on the hybrid all-terrain vehicle 100, but also make full use of the available space in the operator cabin 41 and the power cabin 42, thus improving the space utilization rate. In addition, the driving motor 30 and the engine 20 are provided in the operator cabin 41 and the power cabin 42, respectively, so that the front-rear weight ratio of the hybrid all-terrain vehicle 100 can be relatively balanced, and thus the stability of the hybrid all-terrain vehicle 100 can be improved.

As shown in FIG. 2 and FIG. 3, both the battery power source 32 and the motor controller 31 are provided in the operator cabin 41, so that the battery power source 32 and the motor controller 31 can make full use of the available space in the operator cabin 41, the space utilization rate of the operator cabin 41 can be improved, thus making the structure of the hybrid all-terrain vehicle 100 more compact. Moreover, since the driving motor 30 is further provided in the operator cabin 41, the motor controller 31 is electrically connected with the driving motor 30 and the battery power source 32, so that the electrical connection among the driving motor 30, the motor controller 31 and the battery power source 32 can be closer, the electrical connection among the driving motor 30, the motor controller 31 and the battery power source 32 can be prevented from failing, and the stability and reliability of the electrical connection among the driving motor 30, the motor controller 31 and the battery power source 32 can be improved.

As shown in FIG. 2 and FIG. 3, a seat 43 is provided in the operator cabin 41, an installation space 431 is formed below the seat 43, and the driving motor 30, the motor controller 31 and the battery power source 32 are transversely distributed at intervals in the installation space 431. Specifically, the seat 43 needs to be raised relative to the bottom of the frame 40, and has a certain height, so that it is convenient for drivers and passengers to sit and drivers to drive the hybrid all-terrain vehicle 100. By providing the inside of the raised seat 43 to be hollow, an installation space 431 can be formed below the seat 43, and the driving motor 30, the motor controller 31 and the battery power source 32 can be transversely distributed at intervals in the installation space 431, so that the driving motor 30, the motor controller 31 and the battery power source 32 can make full use of the installation space 431 below the seat 43, improve the utilization rate of the space below the seat 43, the weight of the installation space 431 in the transverse direction can be balanced, and the reliability of the hybrid all-terrain vehicle 100 can be further improved.

In addition, in this way, the seat 43 can protect the driving motor 30, the motor controller 31 and the battery power source 32, and can prevent the driving motor 30, the motor controller 31 and the battery power source 32 from being damaged by the impact of external forces or the erosion of foreign matters, thus prolonging the service life of the driving motor 30, the motor controller 31 and the battery power source 32, and further improving the reliability of the hybrid all-terrain vehicle 100.

As shown in FIG. 2 and FIG. 3, the hybrid all-terrain vehicle 100 can also mainly comprise a fuel tank 50, wherein the fuel tank 50 is provided in the installation space 431, the motor controller 31 and the battery power source 32 are located on a lateral side of the driving motor 30, and the fuel tank 50 is located at the other lateral side of the driving motor 30. Specifically, the fuel tank 50 is located in the installation space 431, so that the fuel tank 50 can also make full use of the installation space 431, which can further improve the space utilization rate of the installation space 431 below the seat 43. Further, since the fuel tank 50 has a large weight, the motor controller 31 and the battery power source 32 are provided at a lateral side of the driving motor 30, and the fuel tank 5 is provided at the other lateral side of the driving motor 30. In this way, the motor controller 31 and the battery power source 32 at a lateral side of the driving motor 30 can be transversely balanced with the fuel tank 50 with a larger weight at the other lateral side of the driving motor 30, so that the layout of the fuel tank 50 is more reasonable and the lateral weight distribution of the seat 43 is more balanced, thus further improving the stability and reliability of the hybrid all-terrain vehicle 100.

As shown in FIG. 2 and FIG. 3, there are a plurality of seats 43, including a driver seat 432 and passenger seats 433. The fuel tank 50 is located below the driver seat 432, the battery power source 32 and the motor controller 31 are located below the passenger seats 433, and the driving motor 30 is located below the passenger seats 433, or the driving motor 30 is located below the gap between the driver seat 432 and the passenger seats 433. Specifically, drivers can sit in the driver seat 432 to drive and control the hybrid all-terrain vehicle 100, and passengers can sit in the passenger seats 433. The driver seat 432 and the passenger seats 433 are transversely distributed at intervals in the operator cabin. The fuel tank 50 is provided below the driver seat 432, and the battery power source 32 and the motor controller 31 are provided below the passenger seats 433, which can not only ensure the stability of the installation of the fuel tank 50, the battery power source 32 and the motor controller 31, and improve the utilization rate of the space below the seat 43, but also prevent the fuel tank 50, the battery power source 32 and the motor controller 31 from affecting the sitting experience of drivers and passengers in the driver seat 432 and the passenger seats 433, thus improving the user experience.

Further, as shown in FIG. 2 and FIG. 3, the driving motor 30 is located below the passenger seats 433, or the driving motor 30 is located below the gap between the driver seat 432 and the passenger seats 433. Specifically, the battery power source 32 and the motor controller 31 are provided at a lateral side of the driving motor 30, and the fuel tank 50 is provided at the other lateral side of the driving motor 30. Since it is necessary to consider the balance of the weight of the seat 43 in the transverse direction when the battery power source 32, the driving motor 30, the controller of the driving motor 30 and the fuel tank 50 are provided in the transverse direction of the seat 43, the driving motor 30 can be selectively provided below the passenger seats 433 according to the difference between the total weight of the battery power source 32 and the motor controller 31 and the weight of the fuel tank 50 on different hybrid all-terrain vehicles 100, or the driving motor 30 can be located below the gap between the driver seat 432 and the passenger seats 433. For example, when the total weight of the battery power source 32 and the motor controller 31 is less than the weight of the fuel tank 50, the weight below the passenger seats 433 will be less than the weight below the driver seat 432. At this time, the driving motor 30 is provided below the passenger seats 433, so that the weight of the driving motor 30 can make up for the difference between the total weight of the battery power source 32 and the motor controller 31 and the weight of the fuel tank 50. Therefore, the weight below the passenger seats 433 can be closer to the weight below the driver seat 432, and the weight ratio of the seat 43 in the transverse direction can be more balanced, so that the stability of the hybrid all-terrain vehicle 100 can be improved more accurately.

As shown in FIG. 2 and FIG. 3, the frame 40 can mainly comprise an underframe 44, wherein the driving motor 30 and the second differential 33 are both provided above the underframe 44. A first transmission shaft 35 is provided between the driving motor 30 and the second differential 33, and the first transmission shaft 35 is located above the underframe 44. Specifically, the driving motor 30 and the second differential 33 are both provided above the underframe 44, so that the stability and firmness of the installation of the driving motor 30 and the second differential 33 on the hybrid all-terrain vehicle 100 can be further improved. Further, the first transmission shaft 35 is provided between the driving motor 30 and the second differential 33, and the first transmission shaft 35 is also located above the underframe 44, so that the stability of the installation of the first transmission shaft 35 on the underframe 44 can be ensured, and the driving motor 30 can continuously and stably transmit power to the second differential 33 through the first transmission shaft 35, thus ensuring the reliability of driving the second differential 33 to operate by the driving motor 30.

In addition, since the driving motor 30 is provided below the gap between the driver seat 432 and the passenger seats 433, that is, the driving motor 30 is located at the middle position of the seat 43 in the transverse direction, and the second differential 33 needs to balance the wheels at both sides, the second differential 33 will be provided opposite to the driving motor 30. In this way, the first transmission shaft 35 will be vertically provided relative to the driving motor 30 and the second differential 33, so that the transmission angle of the first transmission shaft 35 can be made smaller, thus improving the transmission efficiency of the first transmission shaft 35.

As shown in FIGS. 2, 3, 4 and 5, in the operator cabin 41, the underframe 44 is further provided with a base plate of the operator cabin 45. The base plate of the operator cabin 45 comprises a first floor 451, a second floor 452 and a third floor 453. In the transverse direction, the third floor 453 is connected between the first floor 451 and the second floor 452. The third floor 453 protrudes upwards to form an accommodating groove 4531 in which the first transmission shaft 35 is accommodated. Specifically, the first transmission shaft 35 is provided in the accommodating groove 4531, so that the third floor 453 can not only isolate the first transmission shaft 35 from the outside, but also prevent the impact of external forces or the erosion of foreign matters from damaging the first transmission shaft 35 or affecting the normal transmission of the first transmission shaft 35, and prevent the first transmission shaft 35 from affecting drivers and passengers sitting in the operator cabin, thus improving the use experience of drivers and passengers.

Alternatively, as shown in FIG. 1, the engine 20 and the first differential 22 are both provided in the power cabin 42, and a second transmission shaft is connected between the engine 20 and the first differential 22, so that the transmission efficiency between the engine 20 and the first differential 22 is high.

Alternatively, as shown in FIG. 2 and FIG. 3, the output end of the engine 20 is splined with the input end of the first differential 22, so that the engine 20 and the first differential 22 can be integrated, which not only can stabilize the transmission between the engine 20 and the first differential 22, but also reduce the space occupied by the engine 20 and the first differential 22 in the power cabin 42.

Further, according to the space of the power cabin 42, the structural layout of the hybrid all-terrain vehicle 100, and the manufacturing cost, the engine 20 is selectively in transmission connection with the first differential 22 through the second transmission shaft, or the output end of the engine 20 is splined with the input end of the first differential 22 to realize the transmission connection, so that the engine 20 and the first differential 22 can be applied to more hybrid all-terrain vehicles 100, and the applicability of the engine 20 and the first differential 22 can be improved.

Further, as shown in FIG. 2, in the longitudinal direction of the hybrid all-terrain vehicle 100, the first differential 22, the engine 20, the driving motor 30, and the second differential 33 are sequentially arranged. Specifically, the first differential 22, the engine 20, the driving motor 30 and the second differential 33 are sequentially arranged in the longitudinal direction of the hybrid all-terrain vehicle 100, wherein the first differential 22 and the engine 20 are at the rear end of the hybrid all-terrain vehicle 100 in the longitudinal direction, and the second differential 33 and the driving motor 30 are at the front end of the hybrid all-terrain vehicle 100 in the longitudinal direction. When the engine 20 drives the first differential 22 to operate, the hybrid all-terrain vehicle 100 is in the rear-drive state. When the driving motor 30 drives the second differential 33 to operate, the hybrid all-terrain vehicle 100 is in the front-drive state. When the engine 20 and the driving motor 30 simultaneously drive the first differential 22 and the second differential 33 to move, the hybrid all-terrain vehicle 100 is in the intelligent four-wheel drive state.

This arrangement not only can enable the hybrid all-terrain vehicle 100 to adjust the front drive, the rear drive and the intelligent four-wheel drive according to different operating conditions, and enable the hybrid all-terrain vehicle 100 to give consideration to both power and economy, but also make the hybrid all-terrain vehicle 100 have a more compact structure and improve the space utilization rate of the hybrid all-terrain vehicle 100, thus making the structural layout of the hybrid all-terrain vehicle 100 more reasonable. The longitudinal direction is the driving direction of the hybrid all-terrain vehicle 100.

As shown in FIG. 2 and FIG. 3, the engine 20 can mainly comprise a crankcase 201 and a cylinder 202. The cylinder 202 is provided on the crankcase 201 and inclined toward the side away from the driving motor 30, so that the cylinder 202 can make full use of the space at the side of the crankcase 201 away from the driving motor 30, and the installation positions of the cylinder 202 and the driving motor 30 is prevented from interfering with each other, ensuring the independency between the engine 20 and the driving motor 30. In addition, this can further balance the weight distribution of the hybrid all-terrain vehicle 100 in the longitudinal direction, thus improving the stability of the hybrid all-terrain vehicle 100.

The all-terrain vehicle 200 according to the embodiment of the present disclosure is described with reference to FIG. 7 to FIG. 10 hereinafter. The all-terrain vehicle 200 may be a hybrid all-terrain vehicle.

Figure 7:
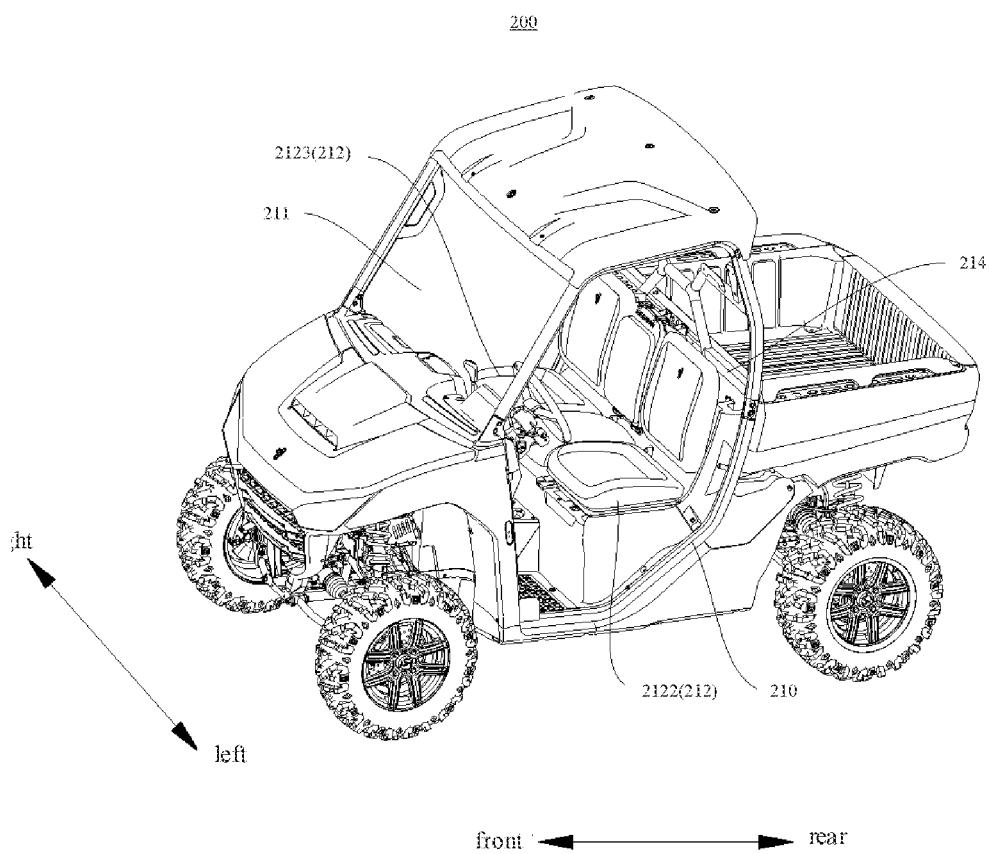
FIG. 7 is a schematic diagram of an all-terrain vehicle according to an embodiment of the present disclosure.
Figure 8:
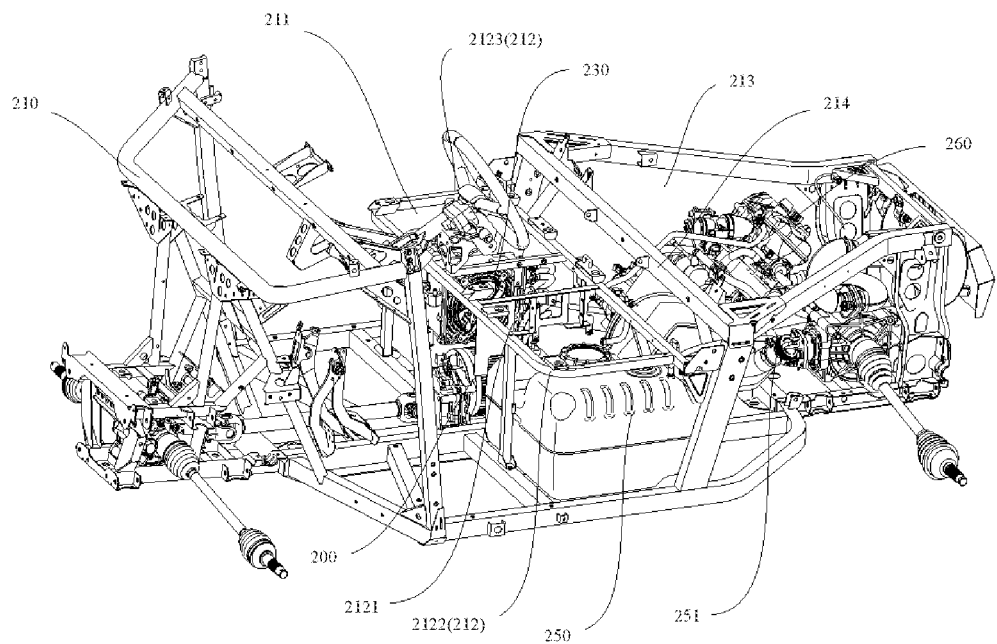
FIG. 8 is a partial schematic diagram of an all-terrain vehicle according to an embodiment of the present disclosure.
Figure 9:
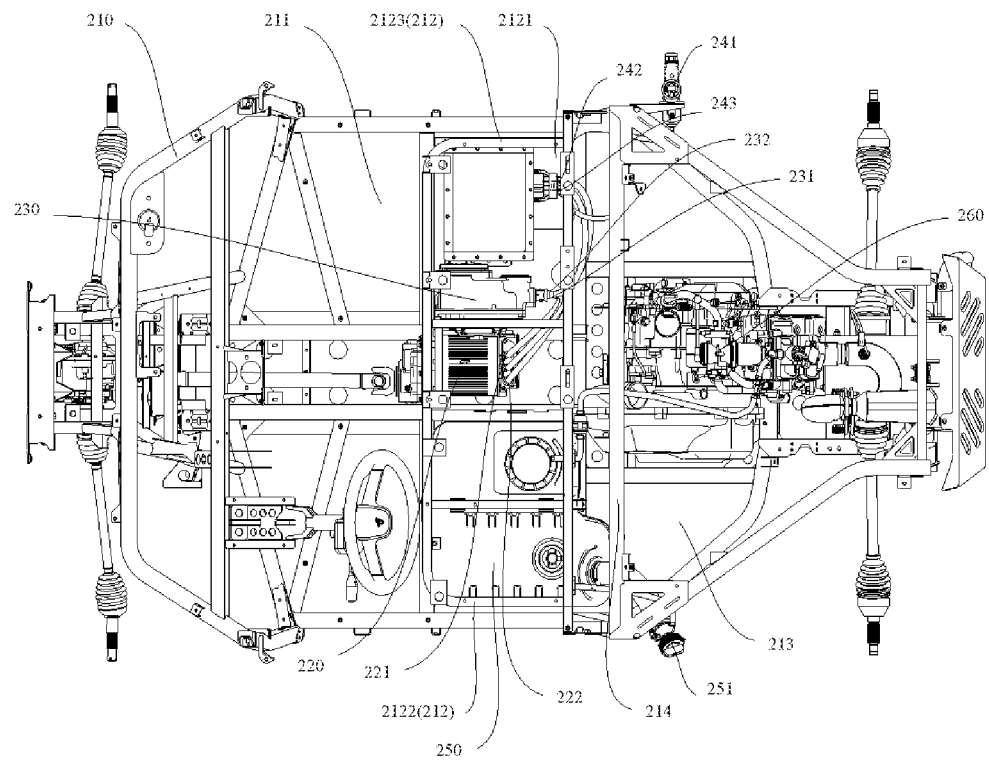
FIG. 9 is a partial schematic diagram of an all-terrain vehicle according to an embodiment of the present disclosure.

As shown in FIG. 7 to FIG. 9, the all-terrain vehicle 200 according to the embodiment of the present disclosure comprises a frame 210, a driving motor 220, a motor controller 230, and a battery power source 240, wherein the frame 210 is formed with an operator cabin 211, and a seat 212 is provided in the operator cabin 211. The seat 212 needs to be raised relative to the bottom of the frame 210, and has a certain height, because the seat 212 is used for drivers and passengers to sit, so that it is convenient for drivers and passengers to sit. When drivers drive the all-terrain vehicle 200, it is convenient for drivers to see the road conditions in front of the all-terrain vehicle 200.

Further, as shown in FIG. 8 and FIG. 9, by providing the inside of the raised seat 212 to be hollow, the driving motor 220, the motor controller 230 and the battery power source 240 can all be provided below the seat 212. Since the seat 212 is transversely arranged in the operator cabin 211, the motor controller 230 is provided at the lateral side of the driving motor 220. The battery power source 240 is further provided at the lateral side of the driving motor 220, which not only ensures the stability and firmness of the installation of the driving motor 220, the motor controller 230 and the battery power source 240 below the seat 212, but also enables the driving motor 220, the motor controller 230 and the battery power source 240 to make full use of the space below the seat 212, thus improving the utilization rate of the space below the seat 212, and making the overall structure of the all-terrain vehicle 200 more compact.

Further, as shown in FIG. 8 and FIG. 9, the driving motor 220, the motor controller 230 and the battery power source 240 are all provided below the seat 212, and the seat 212 can also protect the driving motor 220, the motor controller 230 and the battery power source 240. The seat 212 can isolate the driving motor 220, the motor controller 230 and the battery power source 240 from the outside, and can prevent the driving motor 220, the motor controller 230 and the battery power source 240 from being damaged by the erosion of foreign matters and the impact of external forces, thus improving the reliability of the driving motor 220, the motor controller 230 and the battery power source 240, and prolonging the service life of the driving motor 220, the motor controller 230 and the battery power source 240.

Further, the motor controller 230 is electrically connected with the driving motor 220. The battery power source 240 is electrically connected with the motor controller 230 and the driving motor 220. The motor controller 230 can control the driving motor 220 to be turned on and turned off. The battery power source 240 can supply power to the driving motor 220 to maintain the normal operation of the driving motor 220. The driving motor 220 can output power, which is then transmitted to wheels through the corresponding transmission structure to drive the wheels to rotate. The driving motor 220 can generate electricity when the all-terrain vehicle 200 is in the corresponding operating condition. Moreover, the current generated by the driving motor 220 can be input into the battery power source 240 through the motor controller 230 for storage, or can be directly input into the battery power source 240 for storage, so that the all-terrain vehicle 200 self-generates electricity and the energy consumption of the battery power source 240 can be indirectly reduced.

In addition, since the driving motor 220, the motor controller 230 and the battery power source 240 are transversely distributed at intervals below the seat 212, and the spacing distance therebetween is relatively close, the electrical connection between the driving motor 220, the motor controller 230 and the battery power source 240 can be more stable and reliable, and the length of the cable can be reduced.

Therefore, the driving motor 220, the motor controller 230 and the battery power source 240 are disposed below the seat 212, and the motor controller 230 and the battery power source 240 are both disposed at the lateral side of the driving motor 220, which not only can ensure the stability of the installation of the driving motor 220, the motor controller 230 and the battery power source 240, but also can make full use of the available space below the seat 212, so that the structure of the all-terrain vehicle 200 is more compact. In addition, in this way, the seat 212 can protect the driving motor 220, the motor controller 230 and the battery power source 240, which can improve the reliability of the all-terrain vehicle 200.

As shown in FIG. 8 and FIG. 9, an installation space 2121 is formed below the seat 212. The driving motor 220, the motor controller 230 and the battery power source 240 are transversely distributed at intervals in the installation space 2121, and the battery power source 240 is provided at the lateral side of the motor controller 230 away from the driving motor 220. Specifically, the installation space 2121 is formed below the seat 212, and the driving motor 220, the motor controller 230 and the battery power source 240 are transversely distributed in the installation space 2121 below the seat 212, thus making full use of the installation space 2121 below the seat 212, ensuring that the space below the seat 212 is sufficient, and ensuring the stability of the installation of the driving motor 220, the motor controller 230 and the battery power source 240 below the seat 212.

Further, as shown in FIGS. 8 and 9, the battery power source 240 is provided at the lateral side of the motor controller 230 away from the driving motor 220, so that the driving motor 220, the motor controller 230 and the battery power source 240 sequentially distributed at intervals, it is convenient for the motor controller 230 to be electrically connected with the driving motor 220 and the battery power source 240, the battery power source 240 is located at the lateral side of the driving area, and it is convenient for the battery power source 240 to be charged.

As shown in FIG. 8 and FIG. 9, the all-terrain vehicle 200 can also mainly comprise a fuel tank 250. The fuel tank 250 is provided in the installation space 2121, the motor controller 230 and the battery power source 240 are located at a lateral side of the driving motor 220, and the fuel tank 250 is located at the other lateral side of the driving motor 220. Specifically, the fuel tank 250 is also provided in the installation space 2121, so that the fuel tank 250 can make full use of the installation space 2121, thus further improving the space utilization rate of the installation space 2121 below the seat 212.

Further, since the fuel tank 250 has a large weight, the motor controller 230 and the battery power source 240 are provided at a lateral side of the driving motor 220, and the fuel tank 250 is provided at the other lateral side of the driving motor 220. In this way, the motor controller 230 and the battery power source 240 at a lateral side of the driving motor 220 can be transversely balanced with the fuel tank 250 with a larger weight at the other lateral side of the driving motor 220, so that the layout of the fuel tank 250 is more reasonable and the lateral weight distribution of the seat 212 is more balanced, thus further improving the stability and reliability of the all-terrain vehicle 200.

Figure 10:
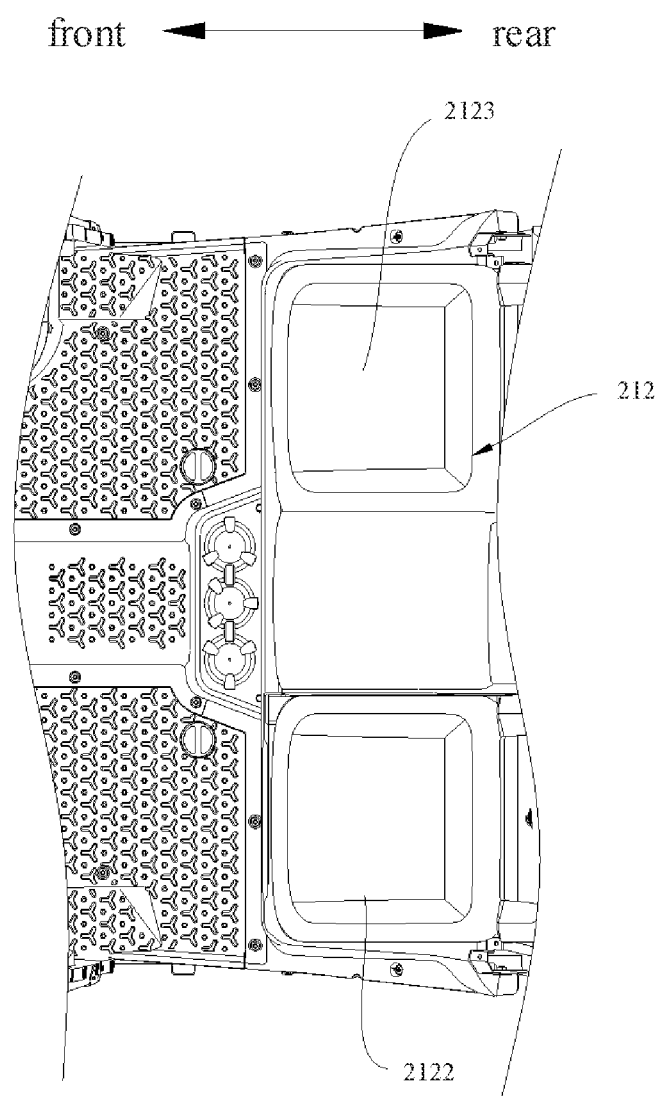
FIG. 10 is a partial schematic diagram of an all-terrain vehicle according to an embodiment of the present disclosure.

As shown in FIGS. 8, 9 and 10, there are a plurality of seats 212, including a driver seat 2122 and passenger seats 2123. The fuel tank 250 is located below the driver seat 2122, the battery power source 240 and the motor controller 230 are located below the passenger seats 2123, and the driving motor 220 is located below the passenger seats 2123, or the driving motor 220 is located below the gas between the driver seat 2122 and the passenger seats 2123. Specifically, drivers can sit in the driver seat 2122 to drive and control the hybrid all-terrain vehicle 200, and passengers can sit in the passenger seats 2123. The driver seat 2122 and the passenger seats 2123 are transversely distributed at intervals in the operator cabin 211. The fuel tank 250 is provided below the driver seat 2122, and the battery power source 240 and the motor controller 230 are provided below the passenger seats 2123, which can not only ensure the stability of the installation of the fuel tank 250, the battery power source 240 and the motor controller 230, and improve the utilization rate of the space below the seat 212, but also prevent the fuel tank 250, the battery power source 240 and the motor controller 230 from affecting the sitting experience of drivers and passengers in the driver seat 2122 and the passenger seats 2123, thus improving the user experience.

Further, as shown in FIG. 8, FIG. 9 and FIG. 10, the driving motor 220 is located below the passenger seats 2123, or the driving motor 220 is located below the gap between the driver seat 2122 and the passenger seats 2123. Specifically, the battery power source 240 and the motor controller 230 are provided at a lateral side of the driving motor 220, and the fuel tank 250 is provided at the other lateral side of the driving motor 220. Since it is necessary to consider the balance of the weight of the seat 212 in the transverse direction when the battery power source 240, the driving motor 220, the controller of the driving motor 220 and the fuel tank 250 are provided in the transverse direction of the seat 212, the driving motor 220 can be selectively provided below the passenger seats 2123 according to the difference between the total weight of the battery power source 240 and the motor controller 230 and the weight of the fuel tank 250 on different hybrid all-terrain vehicles 200, or the driving motor 220 can be located below the gap between the driver seat 2122 and the passenger seats 2123.

For example, when the total weight of the battery power source 240 and the motor controller 230 is less than the weight of the fuel tank 250, the weight below the passenger seats 2123 will be less than the weight below the driver seat 2122. At this time, the driving motor 220 is provided below the side close to the passenger seats 2123, so that the weight of the driving motor 220 can make up for the difference between the total weight of the battery power source 240 and the motor controller 230 and the weight of the fuel tank 250. Therefore, the weight below the passenger seats 2123 can be closer to the weight below the driver seat 2122, and the weight ratio of the seat 212 in the transverse direction can be more balanced, so that the stability of the hybrid all-terrain vehicle 200 can be improved more accurately.

As shown in FIG. 8 and FIG. 9, the fuel tank 250 is connected with an oil filler 251, and the battery power source 240 is connected with a charging port 241. The oil filler 251 and the charging port 241 are oppositely provided at both sides of the vertical plane where the longitudinal central axis of the all-terrain vehicle 200 is located. Specifically, since the fuel tank 250 and the battery power source 240 are provided at both sides of the operator cabin 211 in the transverse direction, respectively, the user can refuel the fuel tank 250 through the oil filler 251 and charge the battery power source 240 through the charging port 241. Further, the oil filler 251 and the charging port 241 are oppositely provided at both sides of the vertical plane where the longitudinal central axis of the all-terrain vehicle is located, which not only facilitates users to quickly find the positions of the oil filler 251 and the charging port 241 according to their usage habits or muscle memory, but also makes the structural layout of the all-terrain vehicle 200 more uniform and reasonable.

As shown in FIG. 8 and FIG. 9, the frame 210 is further formed with a power cabin 213. The power cabin 213 is located at the rear side of the operator cabin 211. A cross beam 214 is transversely provided between the operator cabin 211 and the power cabin 213. The cross beam 214 is fixedly connected with the frame 210. The charging port 241 and the oil filler 251 both extend to one side of the cross beam 214 facing the power cabin 213. Specifically, the power cabin 213 is provided at the rear side of the operator cabin, and the engine 260 and corresponding components can be installed in the power cabin 213, which not only makes the structural layout of the all-terrain vehicle 200 more compact and reasonable, but also makes the weight distribution of the all-terrain vehicle 200 in the front-rear direction more balanced, and improves the stability of the all-terrain vehicle 200. The engine 260 can be used to drive the rear wheels, and the driving motor 220 can be used to drive the front wheels, so that the all-terrain vehicle 200 can selectively realize four-wheel drive according to the operating conditions. Of course, the positions of the engine 260 and the driving motor 220 can be interchanged.

Further, a cross beam 214 is transversely provided between the operator cabin 211 and the power cabin 213, and the cross beam 214 is fixedly connected with the frame 210, so that the overall structural strength of the frame 210 can be improved, the cross beam 214 isolates the operator cabin 211 from the power cabin 213, which can prevent the components in the power cabin 213 from squeezing the operator cabin 211 under the action of external forces so as to affect the drivers and passengers in the operator cabin 211 due to the operator cabin 211 and the power cabin 213 interfering with each other, thus improving the reliability of the all-terrain vehicle 200.

As shown in FIG. 8, below the seat 212, the motor controller 230 is higher than the driving motor 220 and the battery power source 240. Specifically, due to the structural limitation of the motor controller 230, the overall tightness and structural strength of the motor controller 230 will be smaller than that of the driving motor 220 and the battery power source 240. Therefore, the motor controller 230 is provided to be higher than the driving motor 220 and the battery power source 240. In this way, it is not easy for the motor controller 230 to be in contact with foreign matters on the road surface when the all-terrain vehicle 200 passes through the road surface with gathered water or potholes, and it is not easy for the motor controller 230 to be damaged by impact, so that the service life of the motor controller 230 can be prolonged, and thus the reliability of the all-terrain vehicle 200 can be further improved.

As shown in FIG. 9, the driving motor 220 is provided with a first interface 221 for connecting the motor controller 230, and a second interface 222 for connecting the battery power source 240. The motor controller 230 is provided with a third interface 231 for connecting the driving motor 220 and a fourth interface 232 for connecting the battery power source 240. The battery power source 240 is provided with a fifth interface 242 for connecting the driving motor 220 and a sixth interface 243 for connecting the motor controller 230. Specifically, a high-voltage cable is connected between the first interface 221 and the third interface 231, so that the electrical connection between the driving motor 220 and the motor controller 230 can be realized. The motor controller 230 can control the driving motor 220 to be turned on or off, thus ensuring the stability and reliability of the motor controller 230 controlling the driving motor 220.

Further, as shown in FIG. 9, a high-voltage cable is provided between the second interface 222 and the fifth interface 242, so that the battery power source 240 can supply power to the driving motor 220, and the battery power source 240 can maintain the normal operation of the driving motor 220. When the driving motor 220 generates electricity, the generated electricity flows directly from the driving motor 220 to the battery power source 240 through the connection between the second interface 222 and the fifth interface 242, so that the all-terrain vehicle 200 can self-generate electricity and the energy consumption of the battery power source 240 can be indirectly reduced. There may be two second interfaces 222. The two second interfaces 222 are electrically connected with the positive and negative electrodes of the battery power source 240, so that the electrical connection between the driving motor 220 and the battery power source 240 can form a complete and stable loop, and the stability and reliability of the electrical connection between the driving motor 220 and the battery power source 240 can be improved.

Further, as shown in FIG. 9, a high-voltage cable is connected between the fourth interface 232 and the sixth interface 243, so that the battery power source 240 can supply power to the motor controller 230, and the current generated by the driving motor 220 can flow into the battery power source 240 from the motor controller 230 for storage after flowing into the motor controller 230, which can improve the stability and reliability of the electrical connection between the battery power source 240 and the motor controller 230.

As shown in FIG. 9, the first interface 221 and the second interface 222 are both provided at the rear side of the driving motor 220 and are arranged facing upwards. The third interface 231 and the fourth interface 232 are both provided at the rear side of the motor controller 230 and arranged facing backwards. The fifth interface 242 and the sixth interface 243 are both provided at the rear side of the battery power source 240 and arranged facing backwards. Specifically, due to the structural layout of the all-terrain vehicle 200, the engine 260 and related components are provided in the power cabin 213 at the rear side of the driving motor 220. Therefore, the first interface 221 and the second interface 222 are connected at the rear side of the driving motor 220, and the first interface 221 and the second interface 222 are arranged facing upwards. In this way, on the premise of ensuring the stable connection between the first interface 221 and the second interface 222 and the corresponding components, the first interface 221 and the second interface 222 can be kept away from the engine 260 at the rear side of the driving motor 220, so that the heat generated by the engine 260 in normal operation will not have a great influence on the first interface 221, the second interface 222 and the corresponding high-voltage cables, and the structure damage caused by the high temperature at the first interface 221 and the second interface 222 can be prevented. In this way, this can improve the reliability of the first interface 221 and the second interface 222.

Further, as shown in FIG. 9, the third interface 231 and the fourth interface 232 are provided at the rear side of the motor controller 230 and arranged facing backwards. The fifth interface 242 and the sixth interface 243 are provided at the rear side of the battery power source 240 and arranged facing backwards. In this way, the third interface 231 and the fourth interface 232 are located between the motor controller 230 and the power cabin 213. The fifth interface 242 and the sixth interface 243 are located between the battery power source 240 and the power cabin 213. In this way, the first interface 221, the fourth interface 232, the fifth interface 242 and the sixth interface 243 have relatively hidden positions, and are not easily impacted or squeezed by external forces. On the premise of ensuring the stable connection between the first interface 221, the fourth interface 232, the fifth interface 242 and the sixth interface 243 and the corresponding components, the service life of the first interface 221, the fourth interface 232, the fifth interface 242 and the sixth interface 243 can be prolonged, so that the structural reliability of the all-terrain vehicle 200 can be further improved.

An all-terrain vehicle 300 according to an embodiment of the present disclosure is described with reference to FIG. 11 to FIG. 15 hereinafter. The all-terrain vehicle 300 may be a hybrid all-terrain vehicle.

As shown in FIG. 11 to FIG. 15, the all-terrain vehicle 300 according to the embodiment of the present disclosure can mainly comprise a frame 310, a driving motor 320, a transmission shaft 321 and a cover 330, wherein the driving motor 320 and the transmission shaft 321 are both provided on the frame 310. In this way, the stability and firmness of the installation of the driving motor 320 and the transmission shaft 321 in the all-terrain vehicle 300 can be ensured. The driving motor 320 can be used to drive the all-terrain vehicle 300. For example, the driving motor 320 can drive a set of wheels of the all-terrain vehicle 300. The set of wheels may be front wheels. That is, the all-terrain vehicle 300 is a front-wheel vehicle. The set of wheels may also be rear wheels. That is, the all-terrain vehicle 300 is a rear-wheel vehicle.

Further, the driving motor 320 is in transmission connection with the transmission shaft 321. The driving motor 320 can transmit power through the transmission shaft 321 to drive the wheels. That is, the driving motor 320 can first transmit power to the transmission shaft 321, and then transmit power to the wheels through the transmission shaft 321, so as to drive the wheels to rotate, and drive the all-terrain vehicle 300, thus ensuring the reliability of the driving motor 320 driving the all-terrain vehicle 300.

Figure 13:
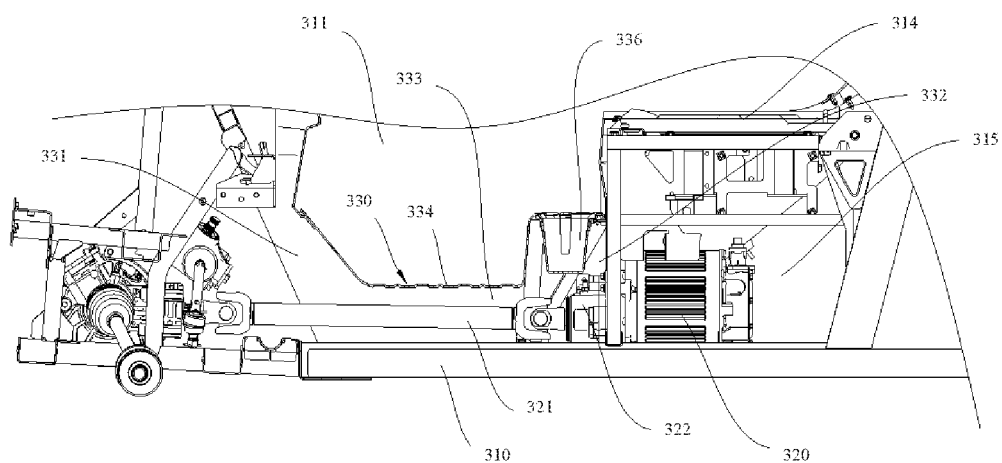
FIG. 13 is a partial cross-sectional view of an operator cabin according to an embodiment of the present disclosure.

As shown in FIG. 13, the cover 330 is formed with an accommodating groove 333 that opens downwards, and the transmission shaft 321 is at least partially accommodated in the accommodating groove 333. Specifically, the transmission shaft 321 is at least partially accommodated in the accommodating groove 333. In this way, the cover 330 can form a relatively airtight shielding protection for the transmission shaft 321, thus isolating the transmission shaft 321 from the outside, and preventing the transmission shaft 321 from being frequently eroded by foreign matters and impacted by external forces so as to result in damage of its own structure. In this way, the structural reliability of the transmission shaft 321 can be improved, and the service life of the transmission shaft 321 can be prolonged.

Further, the cover 330 can be detachably provided on the frame 310, which can facilitate the installation and disassembly of the cover 330, simplify the manufacturing of the all-terrain vehicle 300 to a certain extent, and quickly and conveniently disassemble the cover 330 from the frame 310 when the transmission shaft 321 fails, thus facilitating the disassembly, replacement or maintenance of the transmission shaft 321 in the accommodating groove 333 of the cover 330. In this way, the maintenance difficulty of the transmission shaft 321 can be reduced.

Therefore, the transmission shaft 321 is at least partially accommodated in the accommodating groove 333 with the cover 330 opening downwards, and the cover 330 is detachably provided on the frame 310, so that the cover 330 can play a role of shielding and protecting the transmission shaft 321, the service life of the transmission shaft 321 can be prolonged, the installation and disassembly of the cover 330 can be facilitated, and the cover 330 can be conveniently opened to maintain and disassemble the transmission shaft 321.

Figure 14:
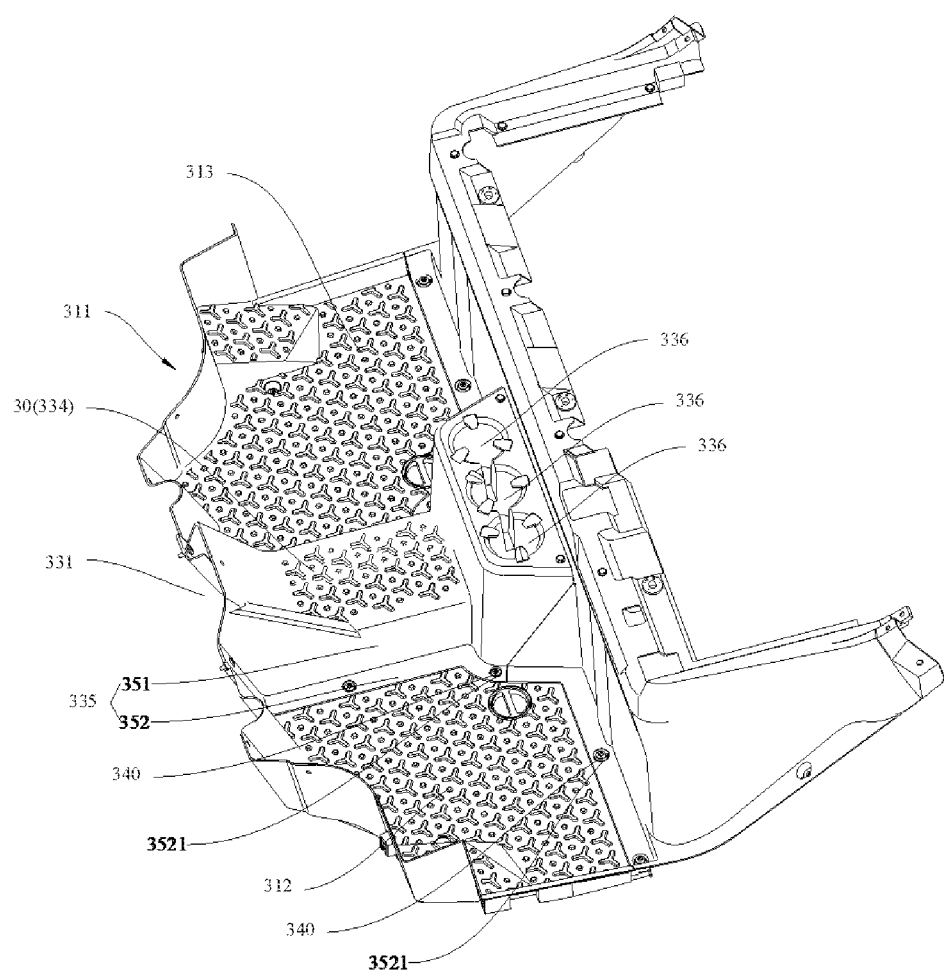
FIG. 14 is a partial schematic diagram of an operator cabin according to an embodiment of the present disclosure.
Figure 15:
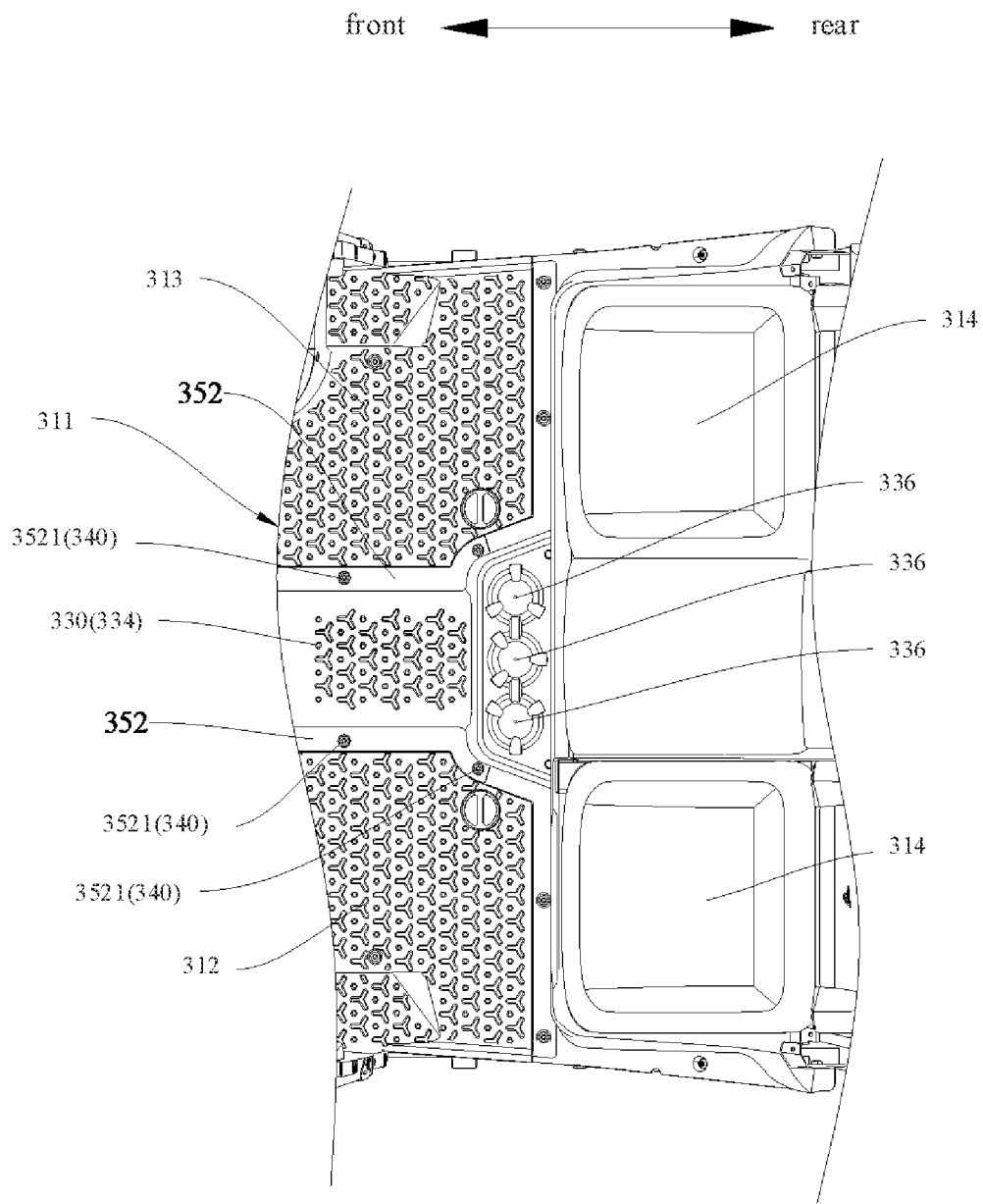
FIG. 15 is a partial schematic diagram of an operator cabin according to an embodiment of the present disclosure.

As shown in FIG. 13 to FIG. 15, the cover 330 may mainly comprise a top plate 334 and side plates 335. The side plates 335 are connected to both sides of the top plate 334. The top plate 334 and the side plates 335 jointly define an accommodating groove 333. The top plate 334 is located above the transmission shaft 321, and the side plates 335 are detachably connected with the frame 310. Specifically, the top plate 334 is provided above the transmission shaft 321, and the side plates 335 are connected to both sides of the top plate 334. The top plate 334 and the side plates 335 jointly define an accommodating groove 333. The top plate 334 can shield and protect the upper part of the transmission shaft 321. The side plates 335 at both sides of the top plate 334 can shield and protect both sides of the transmission shaft 321, so that the accommodating groove 333 can be relatively closed and the transmission shaft 321 can be isolated from the outside. The protective effect of the cover 330 on the transmission shaft 321 can be improved, and the service life of the transmission shaft 321 can be further prolonged.

Further, the side plates 335 are detachably and fixedly connected with the frame 310, and the whole cover 330 can be installed on the frame 310, which not only further facilitates the installation of the cover 330, but also only needs to disassemble the connecting part of the side plates 335 and the frame 310 when the cover is detached from the frame 310. In this way, this can further facilitate the installation and disassembly of the cover body 330, thus further facilitating the maintenance and disassembly of the transmission shaft 321.

As shown in FIG. 13 and FIG. 14, the side plates 335 may mainly comprise a main plate part 351 and a flange 352. One end of the main plate part 351 is connected to the top plate 334, and the other end thereof is connected to the flange 352. The flange 352 is detachably connected to the frame 310. Specifically, one end of the main plate part 351 is connected to one side of the top plate 334, and the other end thereof is connected to the flange 352, wherein the flange 352 can be perpendicular to the main plate part 351 and extend toward one end away from the accommodating groove 333, which can facilitate the fixed connection of the flange 352 with the frame 310. With this arrangement, the main plate part 351 of the side plates 335 can mainly play a role of shielding and protecting the transmission shaft 321. The flange 352 of the side plates 335 can mainly play the role of being fixedly connected with the frame 310, and the effect of fixedly connecting the flange 352 with the frame 310 is stable and reliable, so that the structural design of the side plates 335 can be optimized. The flange 352 can be attached to the installing beam on the frame 310, which can facilitate the fixed attachment therebetween.

Figure 12:
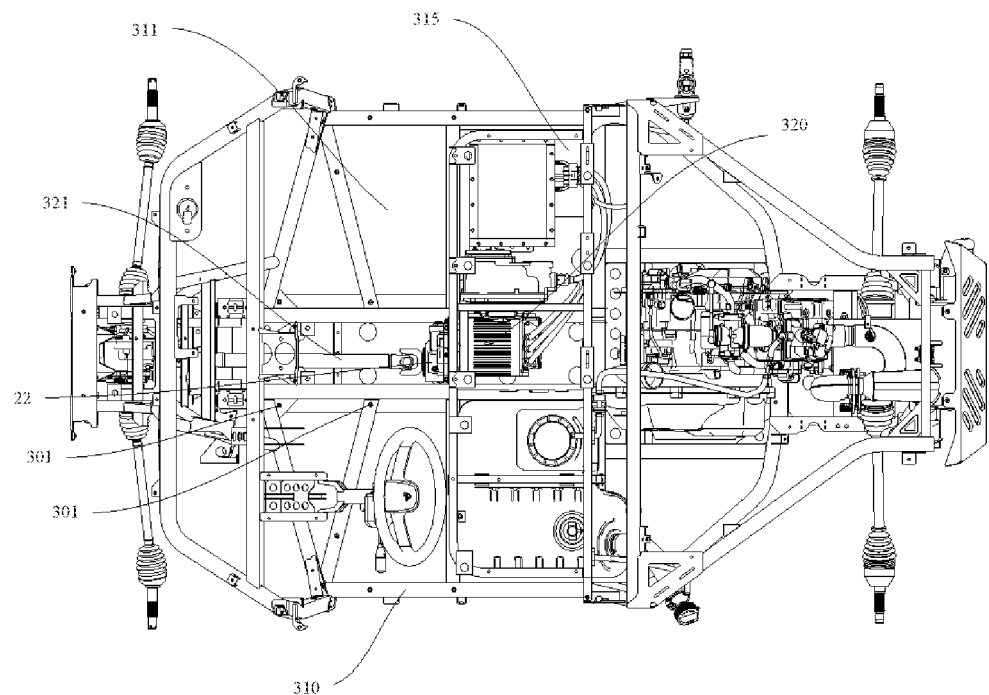
FIG. 12 is a partial schematic diagram of an all-terrain vehicle according to an embodiment of the present disclosure.

As shown in FIG. 12, FIG. 14 and FIG. 15, the flange 352 is provided with a first installing hole 3521, and the frame 310 is provided with a second installing hole 301 at a position corresponding to the first installing hole 3521. The all-terrain vehicle 300 further comprises a fastener 340. The fastener 340 sequentially penetrates through the first installing hole 3521 and the second installing hole 301. Specifically, since the flange 352 is vertically provided relative to the main plate part 351, the flange 352 is parallel to the frame 310 and is closely attached to the frame 310. The flange 352 and the frame 310 are provided with corresponding first installing holes 3521 and second installing holes 301, respectively. After the first installing hole 3521 and the second installing hole 301 are aligned with each other, the fastener 340 can penetrate through the first installing hole 3521 and the second installing hole 301 in turn, and then the side plates 335 are fixedly connected with the frame 310, so that the cover 330 can be installed on the frame 310. The cover 330 is fixedly installed by the fastener 340, which not only can improve the stability and firmness of the installation of the cover 330 on the frame 310, but also realize the installation and disassembly of the cover 330 on the frame 310 only by screwing the fastener 340, and can further reduce the difficulty of installing and disassembling the cover 330 on the frame 310.

As shown in FIG. 12, FIG. 14 and FIG. 15, there are at least two first installing holes 3521, second installing holes 301 and fasteners 340 which correspond to each other, and at least two of the first installing holes 3521 are provided at intervals in the extension direction of the flange 352. Specifically, when the all-terrain vehicle 300 runs on a bumpy road, the joint between the cover 330 and the frame 310 is subjected to a large external force, and the fastener 340 is easy to loosen. By having at least two first installing holes 3521, second installing holes 301 and fasteners 340, a large external force can be dispersed to each joint, so that the stress of each joint is small. In this way, the stability and firmness of the installation of the cover 330 on the frame 310 can be improved. In addition, at least two first installing holes 3521 are provided at intervals in the extension direction of the flange 352, so that the stress of the flange 352 can be more uniform, and thus the firmness of installing the cover 330 on the frame 310 can be further improved.

Figure 11:
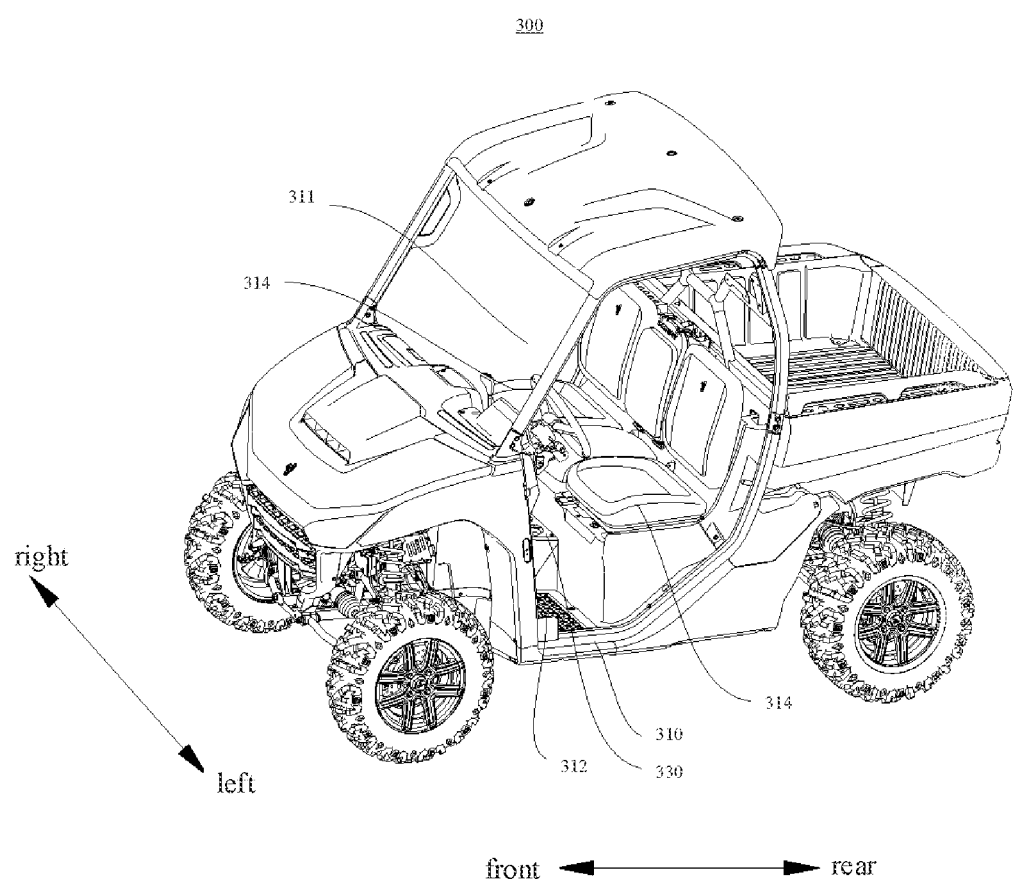
FIG. 11 is a schematic diagram of an all-terrain vehicle according to an embodiment of the present disclosure.

As shown in FIG. 11, FIG. 14 and FIG. 15, the all-terrain vehicle 300 can also mainly comprise a first floor 312 and a second floor 313. The first floor 312 and the second floor 313 are connected to both lateral sides of the cover 330, respectively. The first floor 312 and the flange 352 at one side are stacked, and the second floor 313 and the flange 352 at the other side are stacked. Specifically, the first floor 312 and the second floor 313 can be used for drivers and passengers to place their feet. The first floor 312 and the second floor 313 are connected to both lateral sides of the cover 330, respectively, so that the cover 330 can make full use of the available space between the first floor 312 and the second floor 313 without affecting the placement of feet of drivers and passengers, and the space utilization rate of the all-terrain vehicle 300 can be improved.

Further, the first floor 312 and the second floor 313 are provided with third installing holes corresponding to the positions of the first installing holes 3521 and the second installing holes 301. The first floor 312 and the flange 352 at one side are stacked, and the third installing holes on the first floor 312 correspond to the first installing holes 3521 and the second installing holes 301. The second floor 313 and the flange at the other side are stacked, and the third installing hole on the second floor 313 corresponds to the first installing hole 3521 and the second installing hole 301. After the fastener 340 passes through the first installing hole 3521, the third installing hole and the second installing hole 301 in sequence, the first floor 312 and the second floor 313 can be fixedly connected with the frame 310 and the side plates 335. With this arrangement, while the first floor 312 and the second floor 313 are installed on the frame 310, the installation of the first floor 312 and the second floor 313 with the cover 330 can be more compact. It should be noted that the flange 352 can be located above the first floor 312 and the second floor 313, so that the flange 352 can be directly removed from the frame 310 after the fastener 340 is disassembled. The flange 352 and the whole cover 330 can be conveniently disassembled, and the structural design can be more ingenious.

As shown in FIG. 12 and FIG. 13, the driving motor 320 has an output end 322. The output end 322 is in transmission connection with the transmission shaft 321, and the output end 322 is located in the accommodating groove 333. Specifically, the output end 322 of the driving motor 320 is in transmission connection with the transmission shaft 321. The driving motor 320 can transmit power to the transmission shaft 321 through the output end 322, and can transmit power to the wheels through the transmission shaft 321, so as to drive the wheels to rotate. The output end 322 of the driving motor 320 is further provided in the accommodating groove 333. The cover 330 can also protect the output end 322 of the driving motor 320. The stability and reliability of the transmission connection between the output end 322 of the driving motor 320 and the transmission shaft 321 can be improved. In addition, when the connection between the output end 322 and the transmission shaft 321 fails, the maintenance personnel can inspect and repair the joint between the output end 322 and the transmission shaft 321 by disassembling the cover plate 30.

As shown in FIG. 11 and FIG. 15, the frame 310 is formed with an operator cabin 311, in which a seat 314 is provided. An installation space 315 is formed below the seat 314, a driving motor 320 is provided in the installation space 315, and a cover 330 is provided at the lower front side of the seat 314. Specifically, the seat 314 needs to be raised relative to the bottom of the frame 310 and has a certain height, so that it is convenient for drivers and passengers to sit and drivers to drive the hybrid all-terrain vehicle 300. By providing the inside of the raised seat 314 to be hollow, an installation space 315 can be formed below the seat 314, and the driving motor 320 can be provided in the installation space 315, which not only can ensure the stability of the installation of the driving motor 320 on the all-terrain vehicle 300, but also make the driving motor 320 make full use of the space below the seat 314, prevent the space below the seat 314 from being idle, and improve the space utilization rate of the all-terrain vehicle 300, thus making the structure of the all-terrain vehicle 300 more compact. In addition, the seat 314 can also protect the driving motor 320, which can prevent the driving motor 320 from being damaged by the erosion of foreign matters and the impact of external forces to a certain extent, and prolong the service life of the driving motor 320.

Further, the cover 330 is provided at the lower front side of the seat 314. On the premise that the cover 330 can protect the transmission shaft 321, the cover 330 can be effectively prevented from affecting the positioning of the legs of drivers and passengers when sitting on the seat 314, which can improve the user experience.

As shown in FIG. 13, the front end of the cover 330 is opened to form an air inlet 331, and the rear end of the cover 330 is opened to form an air outlet 332. The air outlet 332 is in communication with the installation space 315. Specifically, the front longitudinal side of the all-terrain vehicle 300 is provided with an air opening. When the all-terrain vehicle 300 is running normally, air from the front side of the all-terrain vehicle 300 can blow to the air inlet 331 of the cover 330 from the air opening. Air flows into the cover 330 through the air inlet 331, and flows out from the air outlet 332 of the cover 330 to the driving motor 320. Since the driving motor 320 generates heat during normal operation, and the surface temperature is high, air blown out from the air outlet 332 of the cover 330 to the driving motor 320 can reduce the temperature and dissipate heat of the driving motor 320. With this arrangement, air in front of the all-terrain vehicle 300 can be made full use of to dissipate heat of the driving motor 320 when the all-terrain vehicle 300 is running. The energy consumption of the all-terrain vehicle 300 will not be increased because of the need to dissipate heat of the driving motor 320, so that it is unnecessary to provide a separate radiator for the driving motor 320. Moreover, the flow of cooling fluid in the driving motor 320 can be omitted. The cover 330 has a simple structure, which can be conveniently manufactured. In addition, the cover 330 with a relatively simple structure can make the air flow through a shorter path faster, which can improve the heat dissipation efficiency of the driving motor 320.

As shown in FIG. 13 to FIG. 15, the top rear side of the cover 330 is provided with a cup groove 336. Specifically, a cup groove 336 is provided on the rear side of the cover 330, the cup groove 336 can be used for placing cups, and the cup groove 336 is provided on the top rear side of the cover 330, so that people sitting on the seat 314 can conveniently take and put the cups in the cup groove 336. There may be a plurality of cup grooves 336. For example, there may be three cup grooves 336.

An all-terrain vehicle 900 according to an embodiment of the present disclosure is described with reference to FIG. 16 to FIG. 21 hereinafter. The all-terrain vehicle 900 may be a hybrid all-terrain vehicle.

As shown in FIG. 16 to FIG. 21, the all-terrain vehicle 900 according to the embodiment of the present disclosure comprises: a frame 910, a driving motor 920, a differential 922, wheels 923 and an air channel part 930, wherein the frame 910 comprises a vehicle underframe 901 on which both the driving motor 920 and the air channel part 930 are provided. The driving motor 920 can be used for driving the all-terrain vehicle 900 to move. Specifically, the differential 922 can be first in transmission connection with the driving motor 920, and then the wheels 923 can be in transmission connection with the differential 922 through the driving half-shaft 924, wherein there may be two wheels 923, and the two wheels 923 can be located at both ends of the differential 922. The power of the driving motor 920 can be transmitted to the differential 922 first. The differential 922 can selectively distribute power to the wheels 923 at both ends of the differential 922 according to the different requirements of the all-terrain vehicle 900 under different road conditions, so as to realize the rotation of the wheels 923. The driving motor 920 can drive the all-terrain vehicle 900 stably and reliably. The wheel 923 may be a front wheel. At this time, the all-terrain vehicle 900 may be a front-driving vehicle. The wheel 923 may also be a rear wheel. At this time, the all-terrain vehicle 900 may be a rear-driving vehicle.

Figure 16:
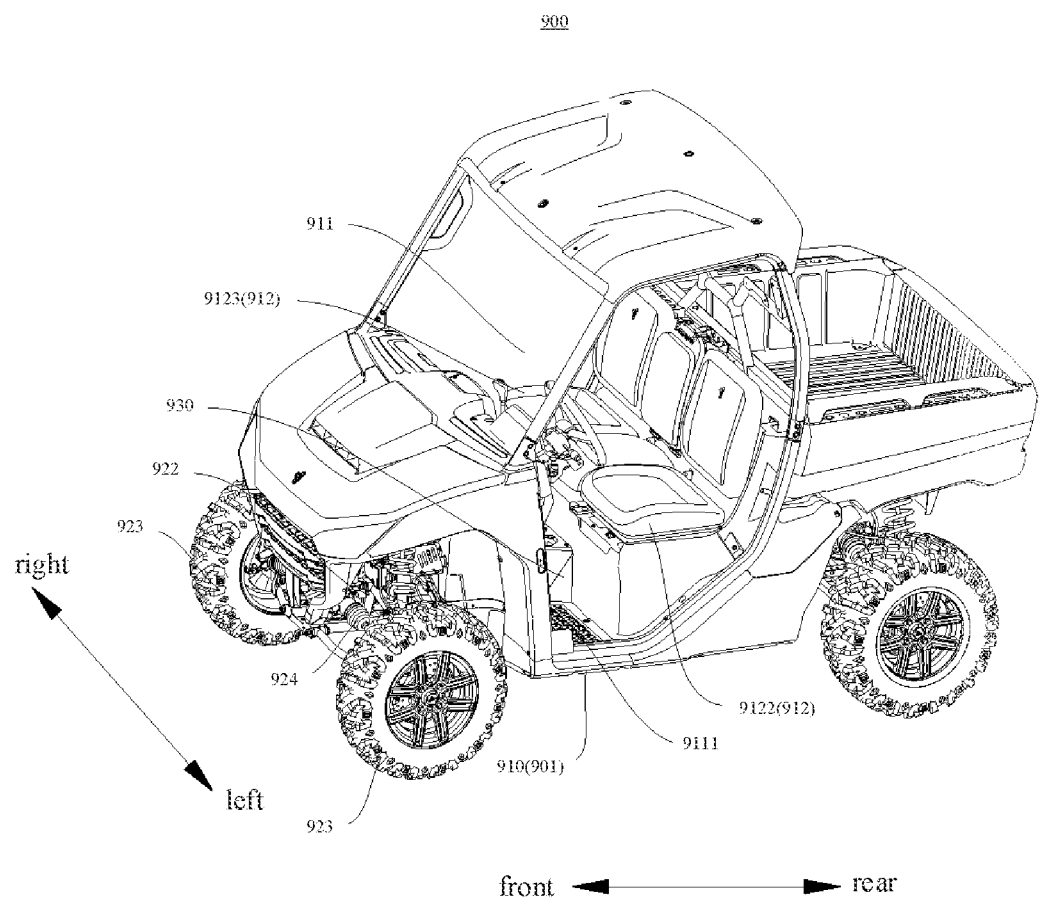
FIG. 16 is a partial schematic diagram of an all-terrain vehicle according to an embodiment of the present disclosure.

As shown in FIG. 16, the air channel part 930 is further provided on the vehicle underframe 901, which can ensure the stability and reliability of the installation of the air channel part 930 on the all-terrain vehicle 900. Further, the air channel part 930 can form an air channel 933 with the vehicle underframe 901. The air channel 933 is provided with an air inlet 931 and an air outlet 932. The air inlet 931 is opened to the outside of the frame 910, and the air outlet 932 is opened to the driving motor 920, so that air blows to the driving motor 920. Specifically, the outside of the all-terrain vehicle 900 is provided with an air opening. When the all-terrain vehicle 900 is running normally, the air outside the all-terrain vehicle 900 can blow from the air opening to the air inlet 931 of the air channel part 930. The air flows into the air channel part 930 through the air inlet 931 and flows out from the air outlet 932 of the air channel part 930 to the driving motor 920. As the driving motor 920 generates heat during normal operation, and the surface temperature is high, the air blown out from the air outlet 932 of the air channel part 930 to the driving motor 920 can reduce the temperature and dissipate heat of the driving motor 920. With this arrangement, the outside of the all-terrain vehicle 900 can be made full use of to dissipate heat of the driving motor 920 when the all-terrain vehicle 900 is running. The energy consumption of the all-terrain vehicle 900 will not be increased because of the need to dissipate heat of the driving motor 920, so that it is unnecessary to provide a separate radiator for the driving motor 920. Moreover, the flow of cooling fluid can be omitted in the driving motor 920. Moreover, the air channel part 930 has a simple structure, which can be conveniently manufactured. In addition, the air channel part 930 with a relatively simple structure can make the air flow through a shorter path faster, which can improve the heat dissipation efficiency of the driving motor 920.

Therefore, the air inlet 931 of the air channel part 930 is opened to the outside of the frame 910, and the air outlet 932 of the air channel part 930 is opened to the driving motor 920, so that during the running of the all-terrain vehicle 900, the air can enter the air channel part 930 from the outside of the all-terrain vehicle 900 through the air inlet 931, and then blow to the driving motor 920 through the air outlet 932 of the air channel 930 to dissipate heat of the driving motor 920. This not only ensures the effect of dissipating heat of the driving motor 920, but also makes full use of the air outside the all-terrain vehicle 900. The principle of heat dissipation is simple. In addition, the air channel part 930 has a simple structure, which is convenient for manufacturing.

Figure 19:
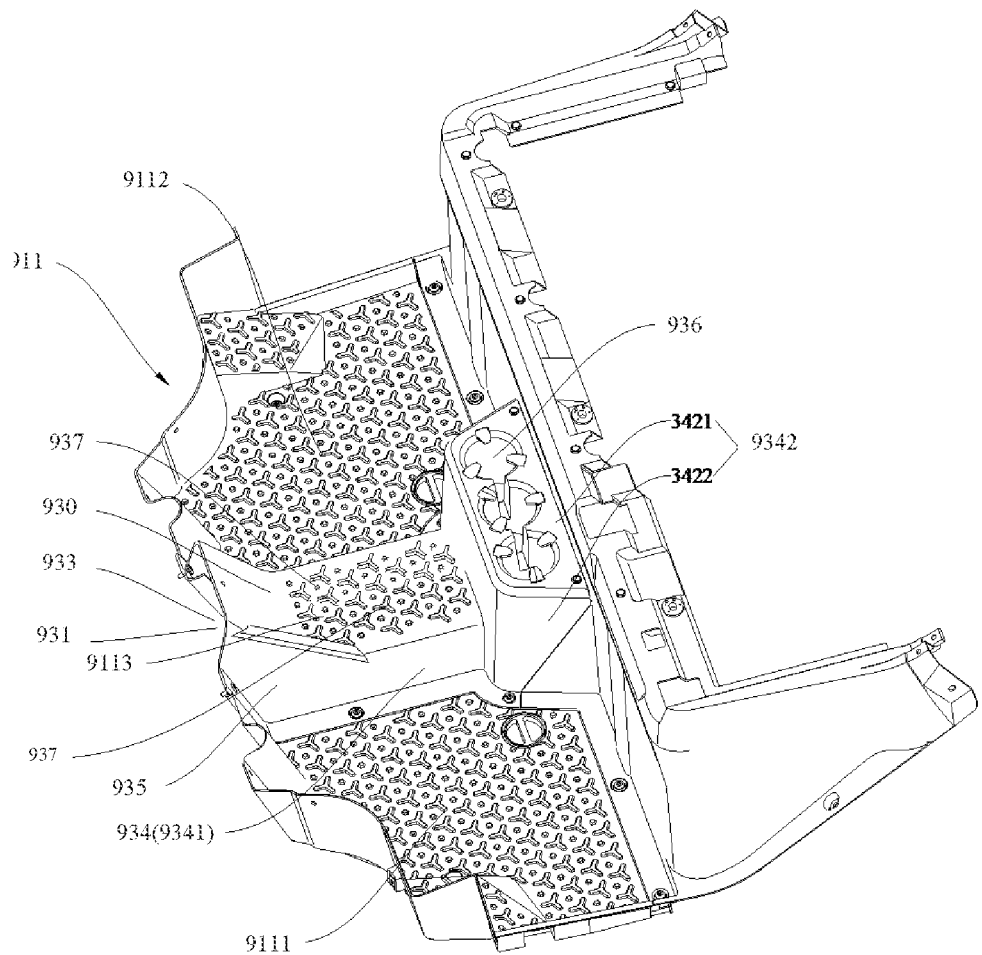
FIG. 19 is a partial schematic diagram of an all-terrain vehicle according to an embodiment of the present disclosure.
Figure 20:
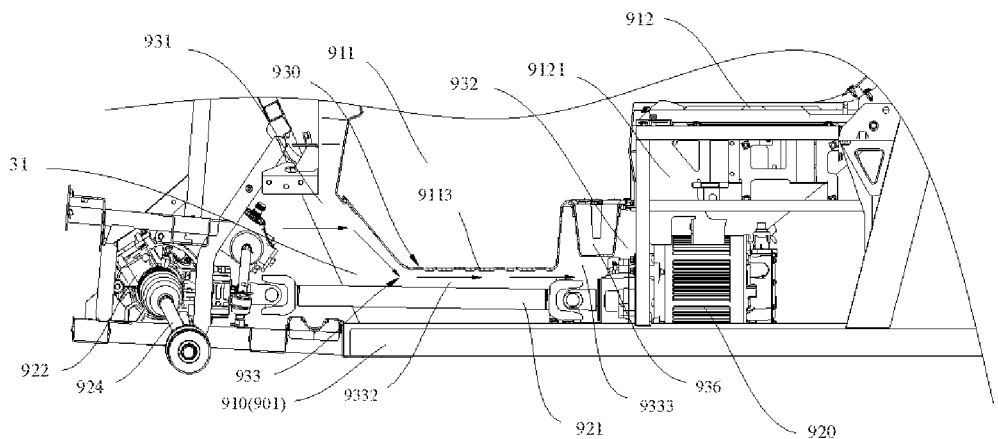
FIG. 20 is a partial cross-sectional view of an all-terrain vehicle according to an embodiment of the present disclosure.
Figure 21:
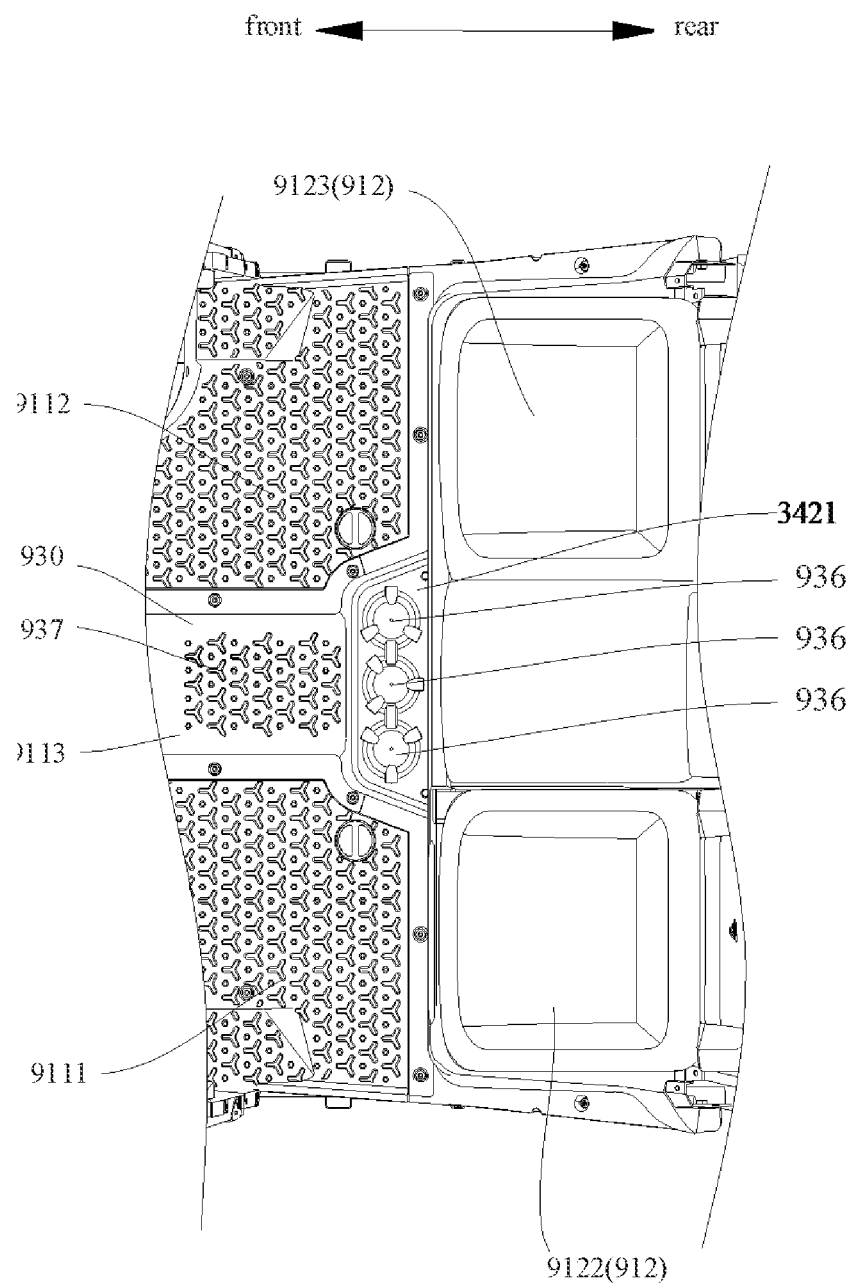
FIG. 21 is a partial plan view of an all-terrain vehicle according to an embodiment of the present disclosure.

As shown in FIG. 19 to FIG. 21, an operator cabin 911 is formed at the front side of the frame 910. The air channel part 930 comprises a front plate of the operator cabin 935 and a base plate of the operator cabin 934. The front plate of the operator cabin 935 and the base plate of the operator cabin 934 are provided above the vehicle underframe 901 and form an air channel 933 with the vehicle underframe 901. The air inlet 931 of the air channel 933 faces the longitudinal front side of the frame 910. Specifically, the base plate of the operator cabin 934 and the front plate of the operator cabin 935 are both provided on the vehicle underframe 901, and the base plate of the operator cabin 934 is provided at the longitudinal rear side of the front plate of the operator cabin 935, so that the front plate of the operator cabin 935, the base plate of the operator cabin 934 and the vehicle underframe 901 jointly define a longitudinal air channel 933, wherein the front plate of the operator cabin 935 is opened to the longitudinal front side. In this way, the air inlet 931 of the air channel 933 can face the longitudinal front side of the frame 910. In this way, when the all-terrain vehicle 900 runs forward normally, the air around the all-terrain vehicle 900 will move backward due to the principle of relative movement, so that the air can quickly enter the air channel 933 through the air inlet 931, thus further increasing the flow speed of air in the air channel 933 and further improving the heat dissipation efficiency of the driving motor 920.

As shown in FIG. 19 to FIG. 21, a seat 912 is provided in the operator cabin 911, an installation space 9121 is formed below the seat 12, a driving motor 920 is provided in the installation space 9121, and an air outlet 932 is in communication with the installation space 9121. Specifically, the seat 912 needs to be raised relative to the bottom of the frame 910, and has a certain height, so that it is convenient for drivers and passengers to sit and drivers to drive the all-terrain vehicle 900. By providing the inside of the raised seat 912 to be hollow, an installation space 9121 can be formed below the seat 912, and the driving motor 920 can be provided in the installation space 9121, which not only can ensure the stability of the installation of the driving motor 920 on the all-terrain vehicle 900, but also make the driving motor 920 make full use of the space below the seat 912, prevent the space below the seat 912 from being idle, and improve the space utilization rate of the all-terrain vehicle 900, thus making the structure of the all-terrain vehicle 900 more compact. In addition, the seat 912 can also protect the driving motor 920, which can prevent the driving motor 920 from being damaged by the erosion of foreign matters and the impact of external forces to a certain extent, and prolong the service life of the driving motor 920.

As shown in FIG. 19 to FIG. 21, the air channel part 930 is provided in the operator cabin 911. The air channel part 930 is located in the front lower part of the seat 12, and the air outlet 932 is in communication with the installation space 9121. Specifically, the air channel part 930 is provided in the operator cabin 911, so that the air channel part 930 can make full use of the available space in the operator cabin 911, thus preventing the arrangement of the air channel part 930 from affecting the structural layout of the all-terrain vehicle 900, and facilitating the manufacturing of the all-terrain vehicle 900. The air channel part 930 is located in the front lower part of the seat 12, preventing the arrangement of the air channel part 930 from affecting drivers and passengers sitting on the seat 12, and improving the user experience. Further, the air outlet 932 of the air channel part 930 is directly in communication with the installation space 9121, so that the air blown out from the air outlet 932 can directly enter the installation space 9121 to be in contact with the driving motor 920, which can ensure that the air is in contact with the whole driving motor 920, and make the heat dissipation more uniform, thus improving the heat dissipation effect of the air on the driving motor 920.

Figure 17:
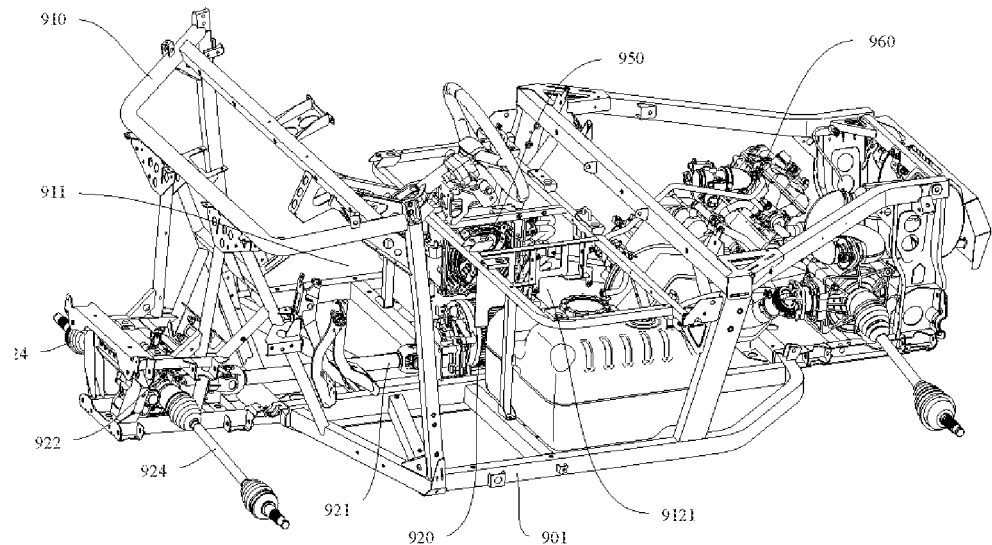
FIG. 17 is a partial schematic diagram of an all-terrain vehicle according to an embodiment of the present disclosure.
Figure 18:
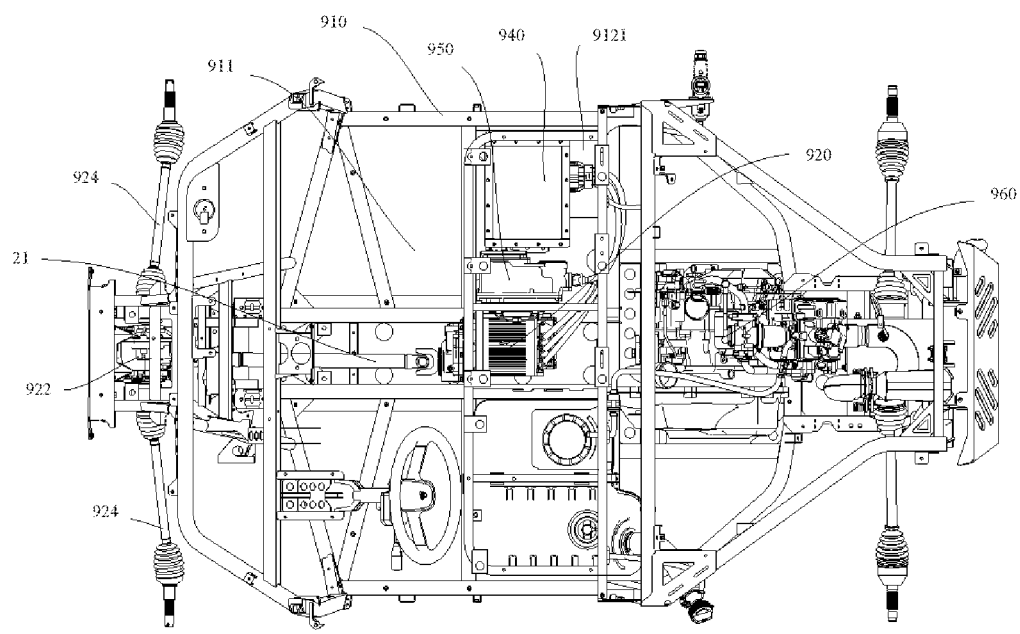
FIG. 18 is a partial schematic diagram of an all-terrain vehicle according to an embodiment of the present disclosure.

As shown in FIG. 17 and FIG. 18, the all-terrain vehicle 900 can also mainly comprise: a battery power source 940 and a motor controller 950. The driving motor 920, the motor controller 950 and the battery power source 940 are transversely distributed at intervals in the installation space 9121. The motor controller 950 is electrically connected with the driving motor 920, and the battery power source 940 is electrically connected with the motor controller 950 and the driving motor 920. Specifically, the driving motor 920, the motor controller 950 and the battery power source 940 are transversely distributed at intervals in the installation space 9121, so that the driving motor 920, the motor controller 950 and the battery power source 940 can make full use of the installation space 9121 below the seat 12, improve the utilization rate of space under the seat 12, make the weight of the installation space 9121 in the transverse direction balanced, and further improve the reliability of the all-terrain vehicle 900.

In addition, the seat 12 can protect the driving motor 920, the motor controller 950 and the battery power source 940, and can prevent the driving motor 920, the motor controller 950 and the battery power source 940 from being damaged by the impact of external forces or the erosion of foreign matters, thus prolonging the service life of the driving motor 920, the motor controller 950 and the battery power source 940, and further improving the reliability of the all-terrain vehicle 900.

Further, the motor controller 950 is electrically connected with the driving motor 920. The battery power source 940 is electrically connected with the motor controller 950 and the driving motor 920. With this arrangement, the motor controller 950 can control the driving motor 920 to be turned on and off, and the battery power source 940 can supply power to the driving motor 920 to maintain the normal operation of the driving motor 920. The driving motor 920 can generate electricity when the all-terrain vehicle 900 is in the corresponding operating condition, and the current generated by the driving motor 920 can be input into the battery power source 940 through the motor controller 950 for storage, and can be directly input into the battery power source 940 for storage, so that the all-terrain vehicle 900 self-generates electricity and the energy consumption of the battery power source 940 can be indirectly reduced. In addition, since the driving motor 920, the motor controller 950 and the battery power source 940 are transversely distributed at intervals below the seat 12, and the distance therebetween is relatively close, the electrical connection between the driving motor 920, the motor controller 950 and the battery power source 940 can be more stable and reliable.

Further, as shown in FIG. 17 and FIG. 18, the rear side of the driving motor 920 is provided with an engine 60, wherein the engine 60 can be used to drive the rear wheels, and the driving motor 920 can be used to drive the front wheels, so that the all-terrain vehicle 900 can selectively realize four-wheel drive according to operating conditions. Of course, the positions of the engine 60 and the driving motor 920 can be interchanged.

As shown in FIG. 19 and FIG. 21, a first floor 9111, a second floor 9112, and a third floor 9113 located between the first floor 9111 and the second floor 9112 are further provided in the operator cabin 911. The top of the third floor 9113 is higher than the first floor 9111 and the second floor 9112 to form a part of the air channel 933. Specifically, the seat 12 can be a driver seat 9122 and a passenger seat 9123. The first floor 9111 and the second floor 9112 are provided at the front lower side of the driver seat 9122 and the passenger seat 9123, respectively, and the first floor 9111 and the second floor 9112 can be used for the driver and the passengers to put their feet.

Further, as shown in FIG. 19 and FIG. 21, the top of the third floor 9113 is higher than the first floor 9111 and the second floor 9112. In this way, the third floor 9113 can cover and seal the top of the front plate of the operator cabin 935 and the base plate of the operator cabin 934, which not only can make the structure of the air channel 933 simple, but also can ensure that the air flows through the air channel 933 quickly and stably, prevent air from leaking and spreading from the front plate of the operator cabin 935 and the base plate of the operator cabin 934, and further improve the heat dissipation effect of air on the driving motor 920. In addition, since the third floor 9113 is located between the first floor 9111 and the second floor 9112, although the third floor 9113 is higher than the first floor 9111 and the second floor 9112, the third floor 9113 will not affect placing the feet of drivers and passengers as the feet of drivers and passengers are placed on the first floor 9111 and the second floor 9112, respectively, which can ensure that the feet of drivers and passengers have sufficient activity space, thus improving the user experiment.

In addition, this can also make the air channel part 930 isolate the first floor 9111 from the second floor 9112, which can ensure the relative independence of the activity areas of the feet of drivers and passengers, and prevent feet of passengers from inadvertently entering the area of the driver and thus affecting the driver driving the all-terrain vehicle 900. This can improve the safety of users.

As shown in FIG. 19 and FIG. 21, the third floor 9113 can be detachably installed between the first floor 9111 and the second floor 9112, which not only facilitates the installation of the third floor 9113, simplifies the manufacturing of the all-terrain vehicle 900 to a certain extent, but also facilitates the disassembly of the third floor 9113, and inspects and repairs the inside of the air channel part 930. The flexibility and reliability of providing the air channel part 930 can be improved.

As shown in FIG. 19 and FIG. 20, the air channel 933 can mainly comprise a front section 9331, a middle section 9332 and a rear section 9333. The middle section 9332 is located between the front section 9331 and the rear section 9333. The front section 9331 is in communication with the air inlet 931, and the rear section 9333 is in communication with the air outlet 932. The cross-sectional area of the front section 9331 is larger than that of the middle section 9332, and/or the cross-sectional area of the rear section 9333 is larger than that of the middle section 9332. Specifically, the front section 9331 is in communication with the air inlet 931, and the cross-sectional area of the front section 9331 is larger than that of the middle section 9332, so that the air inlet area can be enlarged in unit time. More air can enter the air channel 933 from the air inlet 931. The cross-sectional area of the middle section 9332 is set to be small, which can increase the speed of air flowing in the air channel part 930, thus increasing the speed of heat dissipation circulation of the driving motor 920. Further, the cross-sectional area of the rear section 9333 is larger than that of the middle section 9332, so that the air flowing out of the rear section 9333 can form a surrounding heat dissipation effect on the driving motor 920, which can improve the heat dissipation efficiency of the driving motor 920 and improve the reliability of the air channel part 930.

As shown in FIG. 19 to FIG. 21, the front plate of the operator cabin 935 forms a front section 9331 with the vehicle underframe 901. The front plate of the operator cabin 935 is constructed as an inclined plate structure which is obliquely provided downwards from front to rear along the front-rear direction of the frame 910. Specifically, when the air enters the air channel 933 from the outside of the all-terrain vehicle 900, it is necessary to first pass through the front section 9331 of the air channel 933, and the front plate of the operator cabin 935 is constructed as an inclined plate structure which is obliquely provided downwards from front to rear along the front-rear direction of the frame 910, which can guide the air flow. The air flow is smooth, and the noise generated when the air enters the air channel 933 from the air inlet 931 can be reduced, thus further improving the reliability of the air channel part 930.

As shown in FIG. 19 to FIG. 21, the base plate of the operator cabin 934 can mainly comprise a first section base plate 9341 and a second section base plate 9342 connected to the rear of the first section base plate 9341, and the second section base plate 9342 is higher than the first section base plate 9341. The first section base plate 9341 and the vehicle underframe 901 form the middle section 9332 of the air channel 933, and the second section base plate 9342 forms a rear section 9333 with the vehicle underframe 901, which ensures the communication between the middle section 9332 and the rear section 9333 of the air channel 933. The air in the air channel 933 can directly flow to the rear section 9333 through the middle section 9332 of the air channel 933, thus increasing the speed of the air flowing in the air channel 933 and reducing the air loss. In addition, the second section base plate 9342 is provided to be higher than the first section base plate 9341, so that the height of the air outlet 932 can be increased, the diffusion range of the air flowing out of the air outlet 932 can be increased, and the heat dissipation effect of the air flowing out of the air channel 933 on the driving motor 920 can be ensured.

As shown in FIG. 19 to FIG. 21, the second section base plate 9342 can mainly comprise a top wall 3421 and a side wall 3422. The side wall 3422 is vertically provided and connected between the top wall 3421 and the first section base plate 9341. The top wall 3421 is higher than the first section base plate 3421 and higher than the top of the driving motor 920. Specifically, the top wall 3421 is provided to be higher than the first section base plate 9341 and higher than the top of the driving motor 920. The side wall 3422 is vertically provided between the top wall 3421 and the first section base plate 9341. Because the top wall 3421 of the second section base plate 9342 is provided to be higher, rather than providing the whole air channel part 930 to be higher, on the premise of raising the vertical height of the air outlet 932 so as to improve the heat dissipation area of the air when the air flows out of the air channel 933, the influence on the flow rate of the air in the air channel 933 can be avoided. In addition, due to the sitting habits of drivers and passengers, and the general posture of drivers and passengers placing their legs, the top wall 3421 of the second section base plate 9342 is provided to be higher, and the second section base plate 9342 will have no or less influence on drivers placing their legs.

As shown in FIG. 19 and FIG. 20, in the area corresponding to the top wall 3421, the distance between the two side walls 3422 gradually increases in the front-rear direction, and the cross-sectional area of the air outlet 932 is larger than that of the driving motor 920. Specifically, the distance between the two side walls 3422 corresponding to the area of the top wall 3421 gradually increases from front to back, and the cross-sectional area of the air outlet 932 is larger than that of the driving motor 920, so that the air blown from the second section base plate 9342 can form surrounding contact with both lateral sides of the driving motor 920, which can improve the heat dissipation effect of the air blown out of the second section base plate 9342 on the driving motor 920 and further improve the reliability of the air channel part 930.

Further, since the amplitude of the leg movement of the driver and passenger will gradually increase in the direction away from the seat 912, the distance between the two side walls 3422 is set to gradually increase in the front-rear direction. Compared with directly setting the distance between the two side walls 3422 to be large as a whole, such a configuration not only ensures the heat dissipation effect of the driving motor 920, but also reduces the space occupied by the second section base plate 9342 on the first floor 9111 and the second floor 9112, so that the influence of the second section base plate 9342 on the space for legs of drivers and passengers can be reduced, thereby improving the user experience.

As shown in FIG. 19 and FIG. 21, a cup groove 936 is provided at the top wall 3421, and the bottom of the cup groove 936 is higher than the top of the first section base plate 9341. Specifically, since the top wall 3421 is higher than the top of the driving motor 920, in order to prevent the space from the top wall 3421 to the top of the driving motor 920 from being idle, a cup groove 936 can be opened at the top wall 3421, and the cup groove 936 can be used for placing cups or other objects. The bottom of the cup groove 936 is provided to be higher than the top of the first section base plate 9341, which not only can prevent the arrangement of the cup groove 936 from affecting the arrangement of the driving motor 920, but also prevent the high-temperature driving motor 920 from being in contact with the cup groove 936 and burning the cup groove 936, thus improving the structural stability of the cup groove 936. In addition, the bottom of the cup groove 936 is provided to be higher than the top of the first section base plate 9341, which can also prevent the cup groove 936 from blocking the air blowing from the front side of the driving motor 920, thus affecting the heat dissipation of the driving motor 920, and further ensuring the heat dissipation effect of the driving motor 920. There may be a plurality of cup grooves 936. For example, there may be three cup grooves 936.

As shown in FIG. 19 and FIG. 21, the third floor 9113 is distributed with at least two convex ribs 937 with different shapes at the positions corresponding to the first section base plate 9341, and the at least two ribs 937 are staggered at the positions corresponding to the first section base plate 9341 on the third floor 9113. Specifically, at least two convex ribs 937 with different shapes are provided on the third floor 9113 at the position corresponding to the first section base plate 9341, which not only can improve the structural strength of the third floor 9113 and prevent the structure of the third floor 9113 from being easily damaged under the impact of external forces, but also can improve the slip resistance of the third floor 9113 at the position corresponding to the first section base plate 9341. When a user places an object on the third floor 9113 at the position corresponding to the first section base plate 9341, the stability and firmness of the object on the third floor 9113 at the position corresponding to the first section base plate 9341 can be improved. In addition, convex ribs 937 are also distributed on the first floor 9111 and the second floor 9112 to enhance the structural strength and slip resistance of the first floor 9111 and the second floor 9112.

As shown in FIG. 16, the all-terrain vehicle 900 can also mainly comprise a power steering system, which is located in front of the front plate of the operator cabin 935. The power steering system can assist the driver in steering, reduce the steering difficulty of the driver, and thus improve the steering experience of the driver for the all-terrain vehicle. Further, the power steering system is provided in front of the front plate of the operator cabin 935, which not only makes the power steering system closer to the operator cabin 911 and facilitates the connection between the power steering system and the steering wheel in the operator cabin 911, but also makes full use of the space in front of the front plate of the operator cabin 935 and improves the space utilization rate.

As shown in FIG. 17, FIG. 18 and FIG. 20, the output end of the driving motor 920 is connected with a transmission shaft 921. The transmission shaft 921 is located in the air channel 933, and the output end of the driving motor 920 is at least partially located in the air channel 933. Specifically, the transmission shaft 921 is connected to the output end of the driving motor 920. The driving motor 920 can transmit power to the transmission shaft 921 through the output end. The power of the driving motor 920 is transmitted to the wheels 923 through the transmission shaft 921, so that the wheels 923 is rotated, thus realizing the driving effect of the driving motor 920 on the all-terrain vehicle 900. Because the volume of the transmission shaft 921 is smaller than that of the air channel 933, the transmission shaft 921 is provided in the air channel 933, which not only makes the transmission shaft 921 make full use of the available space in the air channel 933 on the premise that the transmission shaft 921 does not affect the ventilation of the air channel 933, but also further improves the space utilization rate. Moreover, the air channel part 930 can protect the transmission shaft 921, which can isolate the transmission shaft 921 from the outside, prevent the transmission shaft 921 from being damaged by the erosion of foreign matters and the impact of external forces, improve the reliability of the transmission shaft 921, and prolong the service life of the transmission shaft 921.

In the description of the present disclosure, it should be understood that the orientational or positional relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial" "circumferential" is based on the orientational or positional relationship shown in the attached drawings, which is only used for the convenience of describing the present disclosure and simplifying the description, rather than indicating or implying that the referred apparatuses or elements must have a specific orientation, be constructed and operated in a specific orientation, and therefore should not be construed as limiting the present disclosure.

In the description of this specification, the description referring to the terms such as "one embodiment", "some embodiments", "illustrative embodiments", "examples", "specific examples" or "some examples" means that the specific features, structures, materials or characteristics described in conjunction with the embodiment or example are included in at least one embodiment or example of the present disclosure. In this specification, the schematic expressions of the above terms do not necessarily refer to the same embodiment or example.

Although the embodiments of the present disclosure have been shown and described, those skilled in the art can understand that many changes, modifications, substitutions and variations can be made to these embodiments without departing from the principles and purposes of the present disclosure, and the scope of the present disclosure is defined by the claims and their equivalents.

What is claimed is:

1. A hybrid all-terrain vehicle, comprising:
   a signal acquirer;
   an engine;
   an engine controller electrically connected with the engine and the signal acquirer;
   a first differential in transmission connection with the engine;
   first wheels in transmission connection with the first differential and located at both lateral sides of the first differential;
   a driving motor;
   a motor controller electrically connected with the driving motor and the signal acquirer;
   a battery power source electrically connected with the driving motor;
   a second differential in transmission connection with the driving motor; and
   second wheels in transmission connection with the second differential and located at both lateral sides of the second differential,
   an installation space is defined below a seat, and the driving motor, the motor controller, and the battery power source are sequentially arranged side by side at intervals in the installation space in a direction transverse to the longitudinal axis of the vehicle.

2. The hybrid all-terrain vehicle according to claim 1, further comprising a frame, wherein the frame forms an operator cabin and a power cabin, and the operator cabin is located at the front side of the power cabin, and
   the driving motor is disposed in the operator cabin and the engine is disposed in the power cabin, or the battery power source and the motor controller are both disposed in the operator cabin.

3. The hybrid all-terrain vehicle according to claim 2, wherein the seat is disposed in the operator cabin.

4. The hybrid all-terrain vehicle according to claim 3, wherein
   the battery power source is electrically connected with the motor controller and the driving motor.

5. The hybrid all-terrain vehicle according to claim 3, further comprising a fuel tank, wherein the fuel tank is disposed in the installation space, the motor controller and the battery power source are located on a lateral side of the driving motor, and the fuel tank is located at the other lateral side of the driving motor.

6. The all-terrain vehicle according to claim 5, wherein the fuel tank is connected with an oil filler, the battery power source is connected with a charging port, the power cabin is located at the rear side of the operator cabin, a cross beam is transversely disposed between the operator cabin and the power cabin, the cross beam is fixedly connected with the frame, and both the charging port and the oil filler extend to one side of the cross beam facing the power cabin.

7. The hybrid all-terrain vehicle according to claim 2, further comprising:
- a transmission shaft disposed on the frame and in transmission connection with the driving motor;
- a cover formed with an accommodating groove which opens downwards, wherein the transmission shaft is at least partially accommodated in the accommodating groove, and the cover is detachably disposed on the frame.

8. The all-terrain vehicle according to claim 7, wherein the cover comprises a top plate and side plates, the side plates are connected to both sides of the top plate, the top plate and the side plates jointly define the accommodating groove, the top plate is above the transmission shaft, and the side plates are detachably connected with the frame.

9. The all-terrain vehicle according to claim 8, wherein the side plate comprises a main plate part and a flange, one end of the main plate part is connected with the top plate and the other end of the main plate part is connected with the flange, and the flange is detachably connected with the frame.

10. The all-terrain vehicle according to claim 9, further comprising a first floor and a second floor, wherein the first floor and the second floor are connected to both lateral sides of the cover, respectively, the first floor and the flange at one side are stacked, and the second floor and the flange at the other side are stacked.

11. The all-terrain vehicle according to claim 1, wherein:
- the driving motor is provided with a first interface for connecting the motor controller and a second interface for connecting the battery power source, and both the first interface and the second interface are disposed at the rear side of the driving motor and the first interface and the second interface are arranged facing upwards; the motor controller is provided with a third interface for connecting the driving motor and a fourth interface for connecting the battery power source, and the third interface and the fourth interface are both disposed at the rear side of the motor controller and are arranged facing backwards; or
- the battery power source is provided with a fifth interface for connecting the driving motor and a sixth interface for connecting the motor controller, and both the fifth interface and the sixth interface are disposed at the rear side of the battery power source and are arranged facing backwards.

12. The hybrid all-terrain vehicle according to claim 1, wherein the first differential, the engine, the driving motor and the second differential are sequentially arranged in a longitudinal direction of the hybrid all-terrain vehicle.

\* \* \* \* \*